US012423660B2

(12) United States Patent
Yan et al.

(10) Patent No.: US 12,423,660 B2
(45) Date of Patent: Sep. 23, 2025

(54) SCALABLE FRAMEWORKS FOR DEPLOYMENT OF DECENTRALIZED TRANSACTIONS

(71) Applicant: BOARD OF TRUSTEES OF MICHIGAN STATE UNIVERSITY, East Lansing, MI (US)

(72) Inventors: Qiben Yan, East Lansing, MI (US); Nikolay Ivanov, East Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 0 days.

(21) Appl. No.: 18/577,189

(22) PCT Filed: Jul. 7, 2022

(86) PCT No.: PCT/US2022/036392
§ 371 (c)(1),
(2) Date: Jan. 5, 2024

(87) PCT Pub. No.: WO2023/283360
PCT Pub. Date: Jan. 12, 2023

(65) Prior Publication Data
US 2025/0045711 A1    Feb. 6, 2025

Related U.S. Application Data

(60) Provisional application No. 63/219,273, filed on Jul. 7, 2021.

(51) Int. Cl.
*G06Q 20/02*    (2012.01)
(52) U.S. Cl.
CPC ......... *G06Q 20/02* (2013.01); *G06Q 2220/00* (2013.01)

(58) Field of Classification Search
CPC .................................................. G06Q 2220/00
(Continued)

(56) References Cited

U.S. PATENT DOCUMENTS

2019/0372778 A1* 12/2019 Palaniappan ......... H04L 9/3239
2020/0394154 A1* 12/2020 Blackshear .......... H04L 9/0637

FOREIGN PATENT DOCUMENTS

WO         2023283360 A2     1/2023

OTHER PUBLICATIONS

International Search Report of related PCT/US2022/036392, mailed Dec. 23, 2022, 4 pages.
(Continued)

*Primary Examiner* — William E Rankins
(74) *Attorney, Agent, or Firm* — QUARLES & BRADY LLP

(57) ABSTRACT

Blockchain-based systems for processing transactions (including, for example, smart contract platforms) are resource intensive and lack sufficient flexibility and scalability. A new framework is disclosed herein, which allows for scalable and flexible deployment of a new class of smart contracts. In some embodiments, transactions according to a given smart contract are processed via a centralized consortium of cells (e.g., cloud nodes) via a consensus overlay method. The cells may confirm results of performing a transaction or set of transactions on a periodic basis, which may be done by fingerprinting the data state for participating smart contracts. This fingerprint can then be stored via a Blockchain method, and verified.

23 Claims, 12 Drawing Sheets

(58) Field of Classification Search
USPC .................................................. 705/35, 44
See application file for complete search history.

(56) References Cited

OTHER PUBLICATIONS

Written Opinion of related PCT/US2022/036392, mailed Dec. 23, 2022, 6 pages.

\* cited by examiner

SCALABLE FRAMEWORKS FOR DEPLOYMENT OF DECENTRALIZED TRANSACTIONS

CROSS-REFERENCE TO RELATED APPLICATIONS

This application is a national stage filing under 35 U.S.C. § 371 of International Application No. PCT/US2022/036392 filed on Jul. 7, 2022, which claims the benefit of U.S. Provisional Patent Application Ser. No. 63/219,273, filed Jul. 7, 2021, the disclosure of each which is hereby incorporated by reference in its entirety, including all figures, tables, and drawings.

STATEMENT REGARDING FEDERALLY SPONSORED RESEARCH

N/A.

SUMMARY

Figure 1:
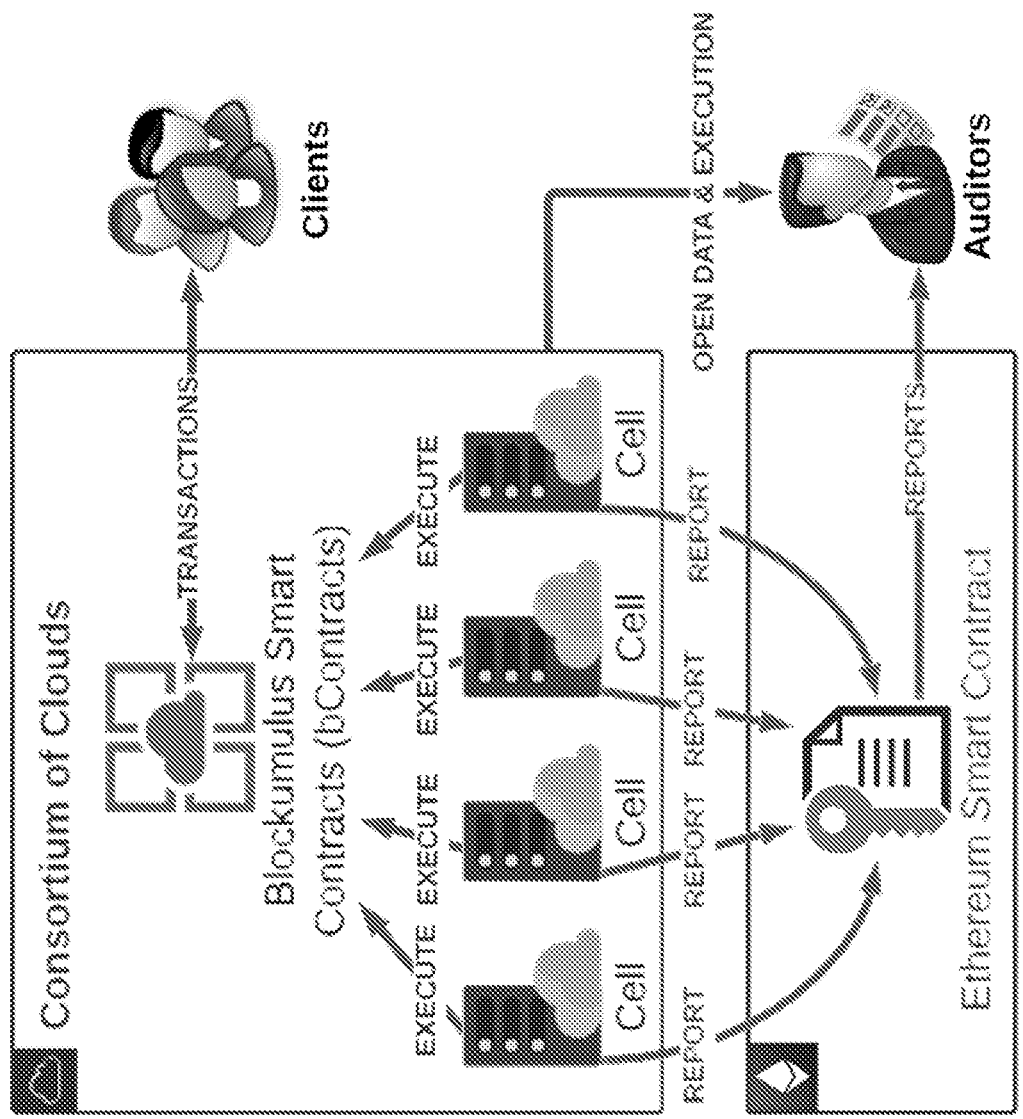
FIG. 1 is a diagram illustrating process and data flow between various constituents of an example implementation of the systems and methods described herein.

The present disclosure describes aspects and features of various systems and methods that improve upon several technological fields including processing electronic transactions. These aspects and features may be embodied, combined and substituted in combinations and permutations as implemented for one or more specific applications.

In one respect, a method for scalable decentralized transaction processing is disclosed. The method includes: receiving a decentralized computing model; receiving one or more first transaction messages for a predetermined period of time; processing the one or more first transaction messages; storing, at a network cell in a cloud consortium, a current data snapshot in the decentralized computing model based on the one or more first transaction messages; fingerprinting, at the network cell in a cloud consortium, the current data snapshot to produce a data fingerprint of the decentralized computing model; and reporting the data fingerprint to a public blockchain system.

In another respect, a service cell for scalable decentralized transaction processing is disclosed. The service cell include: a memory; and a processor coupled to the memory. The processor configured to: receive a decentralized computing model; receive one or more first transaction messages for a predetermined period of time; process the one or more first transaction messages; store, at a network cell in a cloud consortium, a current data snapshot in the decentralized computing model based on the one or more first transaction messages; fingerprint, at the network cell in a cloud consortium, the current data snapshot to produce a data fingerprint of the decentralized computing model; and report the data fingerprint to a public blockchain system.

In another respect, a method for scalable decentralized transaction processing is disclosed. The method includes: deploying more than one decentralized computing model to more than one cell, the more than one decentralized data processing model corresponding to a same decentralized data processing model, the more than one cell being included in a cloud consortium; receiving one or more first transaction messages; processing the one or more first transaction messages in the more than one cell; fingerprints fingerprinting more than one snapshot corresponding to the more than one decentralized data processing model to produce one or more data fingerprints; and reporting one or more data fingerprints based on the more than one snapshot in a blockchain system.

DETAILED DESCRIPTION

The various systems and methods disclosed herein embody and implement numerous advantageous features. And, correspondingly, it is contemplated that the various networks, systems and implementations described herein may be configured in a variety of ways so as to perform some or all of the techniques, aspects, and methods described herein.

Throughout the following description, the term "Blockumulus" may be used generally to refer to any of the various configurations of systems and methods contemplated by this disclosure.

Example Blockumulus

Figure 2:
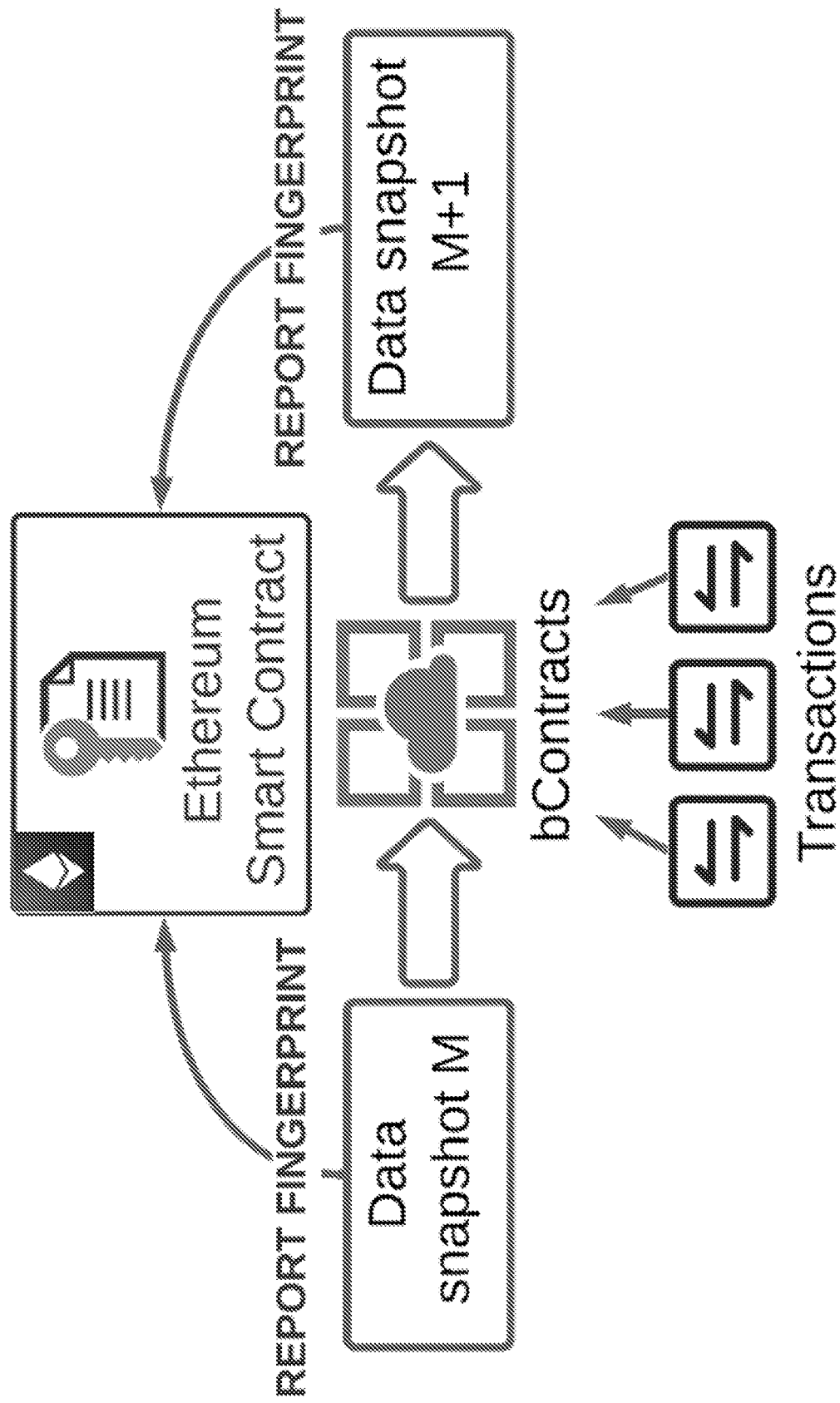
FIG. 2 is a diagram illustrating one example of a method for reporting data snapshot fingerprints according to the disclosure herein.

In some embodiments, a Blockumulus framework implements a decentralized environment for executing smart contracts upon a cloud consortium. The term "cloud consortium" can mean, in some embodiments, a set of M cloud nodes called cells, synchronized by the overlay consensus described herein. (In various implementations the set of cells can be fixed or dynamic, and the nodes may be of a third-party cloud resource, a private server resource, multiple private computing resources, or a combination thereof). The nodes can belong to different cloud service providers, or the same cloud service provider. An overlay consensus is empowered by a smart contract deployed on a third-party public Blockchain, with independent auditors running software for an automated verification of Blockumulus work-flow (see FIG. 1). At a general, functional level, a Blockumulus framework may entail the following components:
Blockumulus Code Execution Model: The code execution in Blockumulus is performed in decentralized Blockumulus smart contracts called bContracts, as shown in FIG. 2. The term "bContract" is used generally here, to refer to a wide variety of types of electronic transaction constructs and the protocols by which the transactions are processed. For example, a bContract could be a voting system, gift card system, bonus points system, stock issuance, commodity purchase, or any other system in which users communicate and interact in a transaction. A company or user that desires to process their transactions via a Blockumulus framework, can determine the function of their own bContract. In some embodiments, an operator of a Blockumulus framework may obtain a protocol (such as a set of rules or an algorithm) from a user for how their transactions should operate (e.g., in a voting system, a government or corporation might provide rules such as "only eligible voters can vote"; "eligible voters can only vote once"; "votes can be case for A or B"; "once a vote is case, it is recorded and cannot be changed"), and the Blockumulus provider would implement these rules into the code of a bContract. In other embodiments, users may provide their own code for a bContract and deploy the bContract via a Blockumulus framework themselves, e.g., via a user or developer portal. Generally speaking, there will be only one way or a defined set of ways for each transaction of a bContract to be processed. The functions of bContracts can be invoked through signed transactions arriving at the Blockumulus network, and the code in bContracts can be executed by appropriate interpreters. In one embodiment, bContracts may be those classes of transactions which an Ethereum smart contract platform might allow or process.

When users desire, the code of bContracts can be openly accessible, so that the execution of transactions could be verified by anyone. bContracts can be written in different programming languages, such as Python or JavaScript.
Blockumulus Data Model:

When public verifiability is a design goal, Blockumulus frameworks can be implemented so as to make all data openly accessible and managed via custom models implemented in the deployed bContracts. In other embodiments, a private institution or enterprise may desire to implement a bContract such that their data is only accessible to specific auditors (e.g., an accounting auditor, or a governmental auditor, or a specified representative); thus a Blockumulus provider may configure the framework to allow users to choose whether their data is public.

In order to store data as part of a Blockumulus framework, each bContract may implement two interfaces: data fingerprinting and data cloning. Data fingerprinting is a function that produces a fingerprint of the bContract's current state or previously saved state. In some embodiments, the fingerprinting function will be a function that produces a 256-bit hash of the current data stored in the bContract. Each bContract developer can decide which hash function to use, or even develop their own function, if needed. The developer of each bContract (e.g., the "customer" of a Blockumulus service) implements a function called "fingerprint" which produces a unique value (such as a unique combination of 256 bits) corresponding to the current state of data in the smart contracts. For example, a developer of a bContract that outputs a data item as a result of processing a transaction (e.g., a word, vote, number, account balance, etc.) may implement the "fingerprint" function interface by using the SHA-256 hash algorithm, and apply the function to current output data.

In some embodiments, the scalable framework (e.g., the Blockumulus service) does not impose requirements on how exactly the fingerprint function is implemented in each of the bContracts. In other embodiments, the scalable framework may require certain criteria be met, such as: a) the fingerprint must be 256 bit; b) for each given data state, the output of the function is the same across all the cells; and/or c) the fingerprint is unique of each given data state of the bContract.

Accordingly, the systems and methods provided herein may allow bContracts to use their own data model, i.e., bContract developers (customers of a framework service, or developers of the service itself who are deploying bContracts for customers) may decide what data formats, abstract data structures, and storage APIs to use. When this flexibility is permitted, then a Blockumulus framework may stipulate that the developer implementing a bContract must use a custom implementation of the fingerprint function for each bContract. This may allow each bContract developer to have flexibility (and, thus scalability) with regard to data storage and representation, whereas in traditional smart contracts (e.g., Ethereum) specific data structures and storage routines provided by the Blockchain framework are required.

Figure 3:
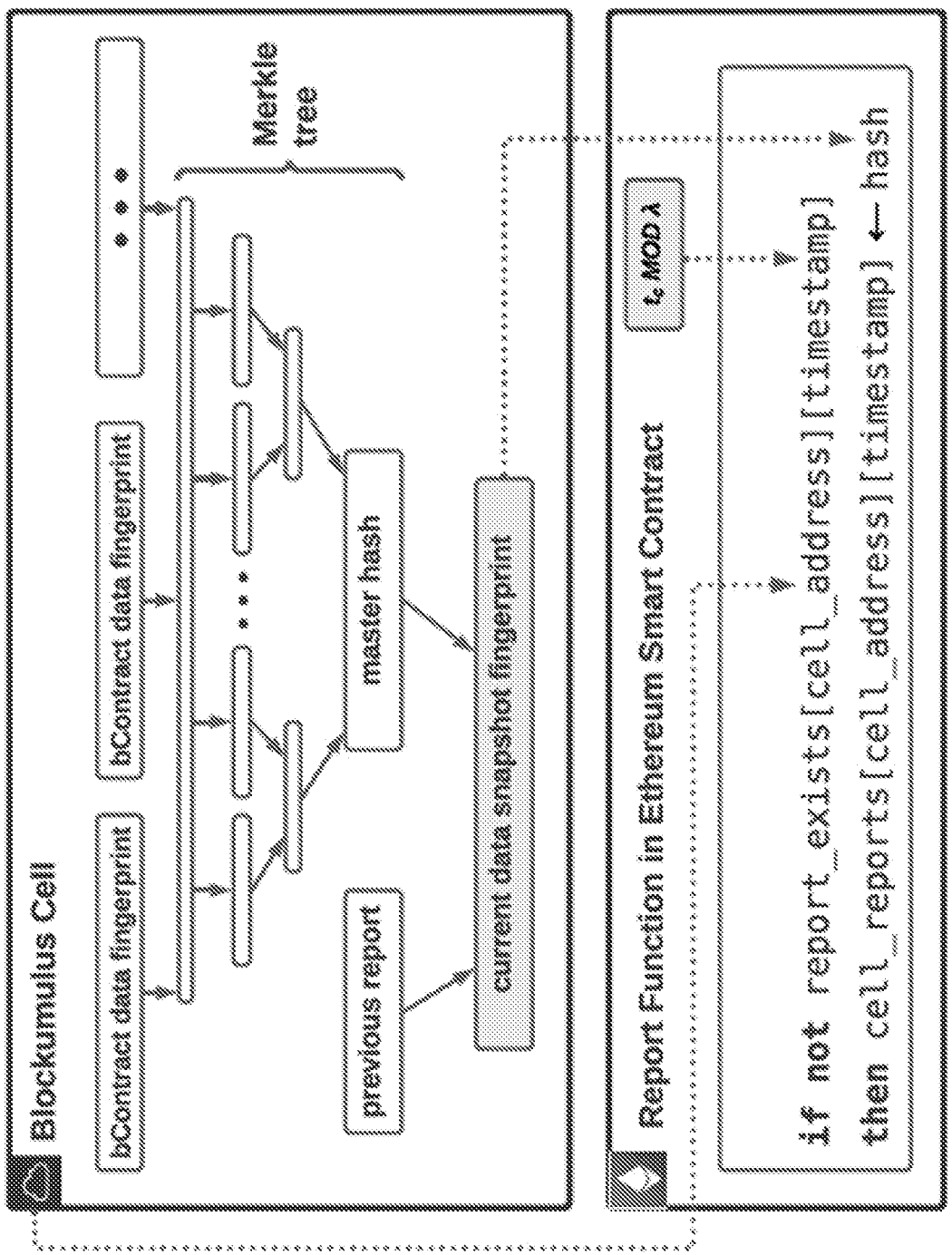
FIG. 3 shows a conceptual diagram of various aspects of a cell according to the systems and methods herein.

The data cloning function may ask the contract to temporarily save its current state of data for subsequent fingerprinting. Blockumulus then combines all the fingerprints reported by the bContracts into a single hash called the data snapshot fingerprint.
Overlay Consensus:

Another aspect of a Blockumulus implementation is the concept of "overlay consensus." Within a given embodiment of Blockumulus, an overlay consensus feature may periodically report the hashes of data snapshots to a dedicated smart contract deployed on a public Blockchain, as shown in FIG. 3. Therefore, once the report is submitted, it cannot be altered. Subsequently, if the report does not match the publicly available and independently verifiable snapshot, the cell cannot be trusted. In essence, the smart contract serves as an online barometer of liveness and integrity of the Blockumulus deployment.

Blockumulus overlay consensus implementations can be thought of as having several potential major differences with traditional/Nakamoto consensus observed in popular public blockchains. First, Blockumulus embodiments may employ a consensus approach that uses a correctness check instead of voting—all incoming transactions are recorded, and there is only one correct way to execute them such that the existence of two conflicting transactions in different cells is ruled out (this concept is described in greater detail below). Second, the framework may be built such that all bContract transactions are executed immediately, during the open session with the client, with a pre-defined decision deadline. As a result, a consensus partitioning (called fork) is impossible in Blockumulus. Unlike in a distributed database, which stipulates identical query execution in all tables, Blockumulus provides autonomous but distinct execution environments for each individual bContract. The contracts with mismatching fingerprints can be excluded from the consensus, and timely fingerprint reports can be guaranteed even if some contracts are unable to establish consensus within their respective contexts. The goal of each bContract is to assure that a transaction is executed identically across all the cells. To enforce this, after each transaction, the called bContract produces a fingerprint of its current data. If the fingerprints do not match, the bContract is temporarily excluded from the snapshot. As a result, each transaction entails an identical state transition of each cell in Blockumulus. If a cell becomes irresponsible or fails the verification, it is excluded from the consensus until the next report cycle.

Report Timing:

As described in greater detail below, a consortium of nodes or cells of a computing resource or group of computing resources may operate in concert to implement a Blockumulus framework. In embodiments of Blockumulus, the cells may operate in concert by having common reporting deadlines according to a given periodicity, and processing the same transactions during the same reporting periods. Thus, prior to deployment of a bContract or prior to deployment of a new Blockumulus framework, the consortium of cells may determine certain system invariants that cannot be changed during the lifetime of the system. One of these invariants is the snapshot report period, denoted $\lambda$, which is measured in seconds. In Blockumulus, the report deadlines are all timestamps divisible by $\lambda$. Therefore, the last report deadline can be calculated as $t_d = t_c$ MOD $\lambda$, where $t_c$ is the current timestamp. Thus, the upcoming report deadline is calculated as $t_{next} = \lambda + t_c$ MOD $\lambda$. Every data snapshot, denoted $S_i$, has a serial number i, which is called the report cycle, represented as $t_d - t_0$, where $t_0$ is the deadline of the very first snapshot in the Blockumulus deployment. Subsequently, the Blockumulus protocol may call for each cell to report the snapshot $S_i$ by the end of cycle i+1 in order to be treated as valid during the cycle i+2.

Blockumulus Components

Each embodiment of a Blockumulus framework may be configured differently. In some embodiments, a Blockumulus framework may be thought of as a utility, such as an Internet Service Provider (ISP) or financial transactions network. A provider that wishes to offer Blockumulus service may host or coordinate the computational resources that are partitioned into cells that implement the Blockumulus service, and may provide a portal, API, integration service, or other mechanism for customers to deploy their bContracts via the framework. The components or actors within a Blockumulus framework deploying a bContract may generally include the following: a consortium of cells, decentralized Blockumulus smart contracts (bContracts), clients, a public smart contract platform, and auditors. Each of these components, including various alternatives for each, is described below.

Cell Consortium:

The cell consortium comprises a set of Blockumulus cells. These cells may be partitions of the same server resource, partitions of a cloud resource, individual computational resources, or combinations thereof. In one embodiment where optimized performance may be desired, the number of cells should be sufficient to guarantee the availability of the system, but it should not be too large (i.e., 10 or less) to avoid performance degradation. Unlike peers in a public Blockchain system, multiple cells in Blockumulus are used to achieve the accessibility and fault-tolerance, rather than the consensus, which will be detailed below. Moreover, since cloud resources can allow for vertical scalability (i.e., adding resources to existing entities), a large number of cells (horizontal scalability) is not needed for performance advancement either. The size of the consortium and the set of identities of the participating cells may be the invariants to be decided at the time of deployment.

Blockumulus Cell:

A Blockumulus cell is a network node or partition, which is implemented by one or more processors of one or more computational resources. In one embodiment, all of the cells may reside in the cloud, which is sufficient for participating in Blockumulus consensus. A cell can be represented by a virtual machine, physical dedicated server, or a computer cluster—whichever meets the demands of the provider that will implement the Blockumulus framework. The cells can be operated or controlled by a single service provider, or may be controlled by different owners/operators. Security and verifiability may be improved in some circumstances if cells are not all controlled by a single actor; however as described above when more cells (or more parties controlling cells) are added, system performance can degrade. Where a framework according to the present disclosure hinges its overlay consensus on an independent Blockchain platform (e.g., the Ethereum smart contract), which is already supported by thousands of nodes world-wide, there may be less advantage to deploying more cells to enhance security or integrity of the consensus. Even a single Blockumulus node can sustain the system. However, the advantages to having multiple cells include: 1. Fault-tolerance through replication. If one node crashes, goes offline, is compromised, etc., other nodes continue supporting the system. 2. To provide diversity of available Blockumulus subscriptions. Similar to choosing between internet or cellular providers, a scalable framework is supported by multiple cells from multiple providers, to incentivize a multi-provider ecosystem for accessing the framework.

Cells may persistently be part of the same consortium for all types of bContracts, or different cells may be utilized to comprise the "consortium" for only certain bContracts. For example, a given cell might be in a consortium with 9 other cells for a bContract that process gift card transactions, but might be in a consortium with 9 different cells (or some overlapping cells) for other bContracts.

bContracts:

Blockumulus smart contracts (bContracts), are decentralized programs deployed on Blockumulus, whose functionality is similar to that of other types of smart contracts, such as smart contracts in Ethereum or chaincode in Hyperledger Fabric. However, as described throughout this disclosure, the way that bContracts are deployed can necessitate or make desirable differences between bContracts and other types of smart contracts. For example, bContracts are deployed via a cloud environment, not on the Blockchain, which allows for different levels of developer/customer accessibility and flexibility. And, as discussed above, bContracts are responsible for fingerprinting their current state. In contrast, the state of Ethereum and other smart contracts is controlled and recorded by the blockchain's virtual machine, such as EVM. The code of bContracts can be, but does not need to be, deterministic if the data fingerprints match across the cells; in contrast, Ethereum smart contracts must be deterministic state machines. bContracts can also implement their own data models (e.g., a bContract may store data in an SQLite database, flat files or the Blockumulus CAS storage), whereas Ethereum and other smart contracts must use the data management APIs and models provided by their respective blockchains. Additionally, bContracts are interpretable and can be implemented in any general-purpose programming language (e.g., Python or JavaScript) supported by the current version of the scalable framework being used. In contrast, Ethereum and other smart contracts must be written in a domain-specific language, such as Solidity or Vyper, and must be compiled into EVM bytecode.

In some embodiments, there can be more than one category of bContract. Two types of bContracts that may be utilized are: system bContracts and community bContracts. Community bContracts are those determined by users, for processing various transactions. The system bContracts can be thought of as operations within a Blockumulus framework that perform various system functions and assist in making the deployment of users' community bContracts more efficient. In some embodiments, they are pre-deployed and cannot be removed. The community bContracts are developed and deployed by clients.

Blockumulus Clients:

A Blockumulus client or user is a person, institution, company, or software that interacts with a deployed bContract. Blockumulus can be implemented as a permissionless environment for clients, which means that clients do not have to register a Blockumulus account. In other embodiments, a Blockumulus provider or a client utilizing a Blockumulus service may desire that users have a verified account. However, akin to the ISP model for Internet access, a Blockumulus service provider may desire to require that clients should have a subscription to the Blockumulus service through one of the cells. The subscription, however, does not confer any control over the Blockumulus framework or how the cells process transactions. Rather, the purposes of the subscription can be for other purposes, such as to charge for data transferred or time period during which the subscription is active or to keep in contact with clients. This contrasts with the transaction fee collection observed in public blockchains. As a result, Blockumulus offers flexibility that allows cells to establish their own pricing policies to compete for customers.

Smart Contract:

Each Blockumulus deployment may also be configured to communicate with a smart contract on an external Blockchain platform or similar platform, which stores hashes of the reported snapshots. To avoid retrospective modification, the repeated reporting for the same timestamp is prohibited by the logic of the smart contract. In alternative embodiments, the smart contract platform may be the Ethereum smart contract platform, another existing platform, or a new smart contract platform based on Blockchain or a similar network that provides data verification may be used.

Figure 4:
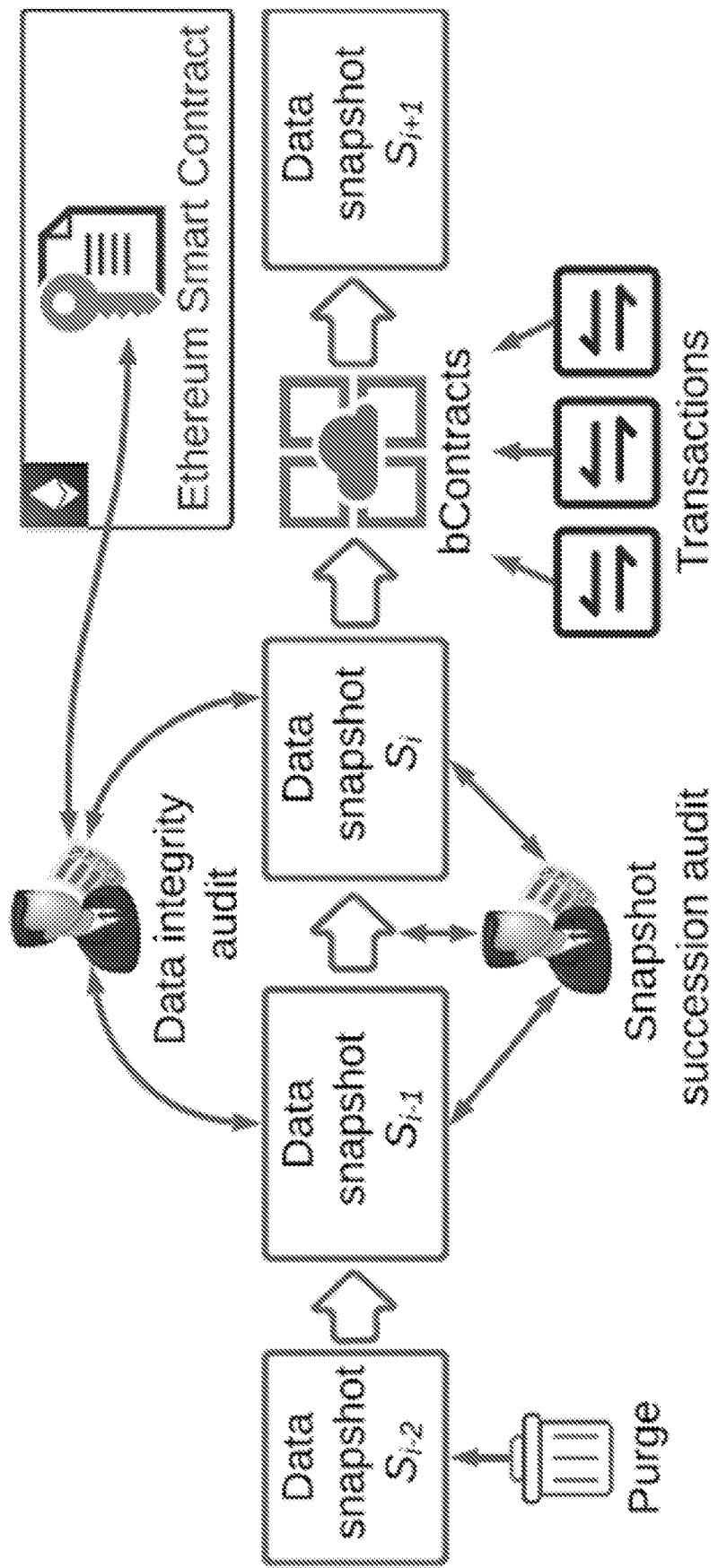
FIG. 4 shows an example of Blockumulus audit procedure.

Blockumulus Auditors:

Akin to public Blockchain, Blockumulus can be implemented as an open-data system with transparent execution, i.e., Blockumulus data can be available to everyone, and everyone can independently trace state transition between a given pair of subsequent data snapshots. In one embodiment, auditors are voluntary permissionless participants that run software to oversee the integrity of the Blockumulus deployment. Thus, the community auditing model, which demonstrated its efficiency in public blockchains, is also able to be employed in Blockumulus. In another embodiment, auditors may be specified, trusted third parties such as accounting firms, government officials, non-profit consortia, or the like. Auditors can also be paid participants, community enthusiasts, security bounty hunters, or academic researchers. Moreover, cells in the consortium can perform cross-audit in an open or blinded fashion. The process of auditing requires only a server and the auditing software that is running on this server to monitor the integrity of Blockumulus. FIG. 4 shows an example procedure of a Blockumulus audit. The auditing software performs two major tasks: snapshot succession audit and data integrity audit. The snapshot succession audit is the verification that all the transactions processed by all bContracts between two reports indeed entail a state transition from one data snapshot into another. The data integrity check verifies that: a) the snapshot fingerprints have been reported to the smart contract on time; and b) the fingerprints in reports match the actual data in the cells.

Blockumulus Cell Architecture

Figure 5:
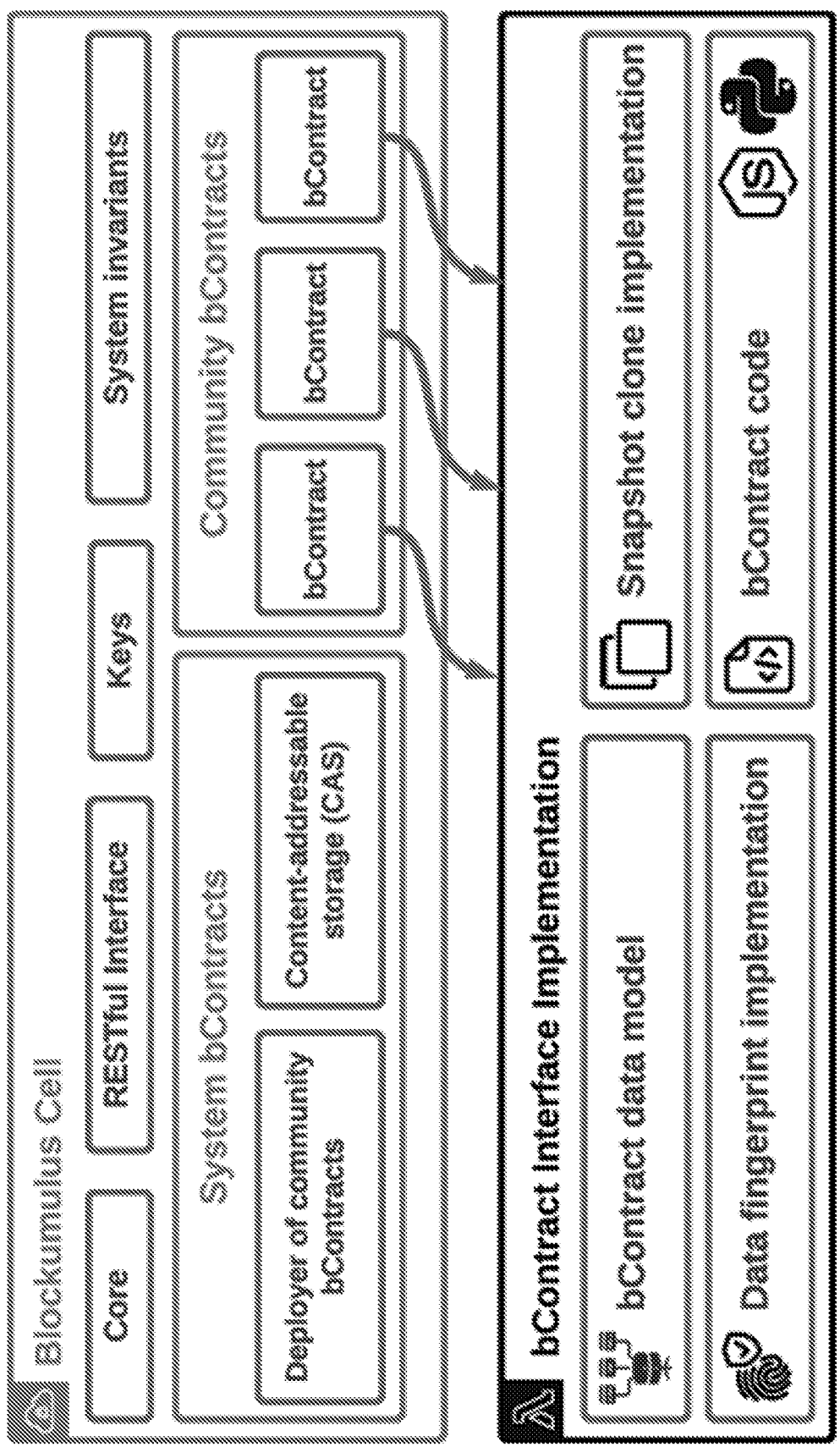
FIG. 5 is a functional block diagram that conceptually illustrates examples of various functions that may be performed by a cell and possible interface mechanisms.

Referring now to FIG. 5, an example architecture of a cell is shown. As illustrated, the cell may contain the following modules to perform various functionalities.

Blockumulus Core:

A Blockumulus cell may have a core set of software instructions, which cause the cell (via its computing resource), to effectuate various system tasks like networking, cryptography, synchronization, protocol, process and thread management, signature and authenticity verification, transaction parsing, data encoding and decoding, and communication with the smart contract.

Communication Interface:

In various embodiments, a Blockumulus cell may engage in some or all of six different vectors of communication: client-cell, cell-cell, auditor-cell, cell-Blockchain, auditor-Blockchain, and client-auditor. The client-cell, cell-cell, and auditor-cell communications may be implemented via a uniform RESTful interface. Specifically, each request is either GET or POST HTTP request with the bod formally represented as the set:

$$M = \{P = \langle A_s, A_r, O, \eta, \tau, t, D \rangle, Sig_s(P)\} \quad \text{Eq. 1}$$

where P is the payload of the message, and $Sig_s$ is the ECDSA signature calculated via the private key of the sender. The tuple P has the following components: $A_s$ is the public address of the sender, $A_r$ is the public address of the intended recipient, O is the operation code, $\eta$ is a random nonce used as a message ID, $\tau$ is the ID of the message that M is replying to (if applicable), t is the current timestamp, and D is the data, whose format is determined by O.

Keys:

Each cell may use a Blockchain platform account to represent itself within Blockumulus. The set of public addresses of Blockumulus cells is fixed for each deployment and thus can be hardcoded in the Blockchain smart contract. For example, in one embodiment, the Ethereum smart contract platform may be used. In Ethereum, a public address of an account is the 160-bit prefix of the Keccak256 has of the account's public key. In other platforms, the address of an account will be determined by other means, but each cell can still use its account to represent itself within Blockumulus System Invariants:

Some parameters of a Blockumulus deployment that remain constant for a lifetime are called the system invariants. Examples of system invariants may be: unique deployment ID, identities of the cells, reporting period $\lambda$, initial timestamp $t_0$, etc. However, the IP addresses of cells are not among the invariants, which allows cells to change location, or network configuration—we assume that these settings are exchanged between cells.

System bContracts:

The system bContracts are pre-implemented as part of Blockumulus, and they might not be removed. These bContracts deliver essential functionality to the system, and their number can grow as Blockumulus framework evolves. The current version of Blockumulus includes two system bContracts: community bContract deployer, and content-addressable storage (CAS). The community app deployer serves as an interface for developers to add their community bContracts to Blockumulus. The CAS contract has two major functions: a) it allows to store large files outside of data models of community bContracts, thereby significantly improving the performance of fingerprinting and cloning; and b) it establishes a secure communication channel between bContracts, which are otherwise autonomous and isolated.

Community bContracts:

Community bContracts are developed and deployed by users of Blockumulus. In some embodiments, the framework is designed so that cells have no power to modify, censor, or control these contracts. Instead, each cell must independently process each transaction submitted of the bContract category such that the fingerprint of their respective data snapshots align. The deployer of a community bContract can specify the ownership and other parameters of the contract, including the ability to destroy one.

bContract Interface:

In order to create a bContract, a provider of Blockumulus service could implement a standard bContract interface, which includes smart contract data model, data fingerprinting, and snapshot cloning. Then, the developer writes the bContract code for the interpreter specified in the configuration.

Blockumulus Protocol

Data Snapshots and Fingerprinting:

Data processed via a Blockumulus framework for given bContracts is stored according to their respective data models. For example, one bContract can store data in binary files, while others may use SQLite. The clients who submit each bContract can determine the type of data to be stored for each transaction, and the interface for the Blockumulus framework will store and acquire data snapshots accordingly. To prevent operations with large data instances, bContracts can upload data blobs to Blockumulus CAS, and refer to these blobs via their hashes. Blockumulus can perform CAS reference counting, purging CAS entries only when their reference counters reach zero.

Figure 6:
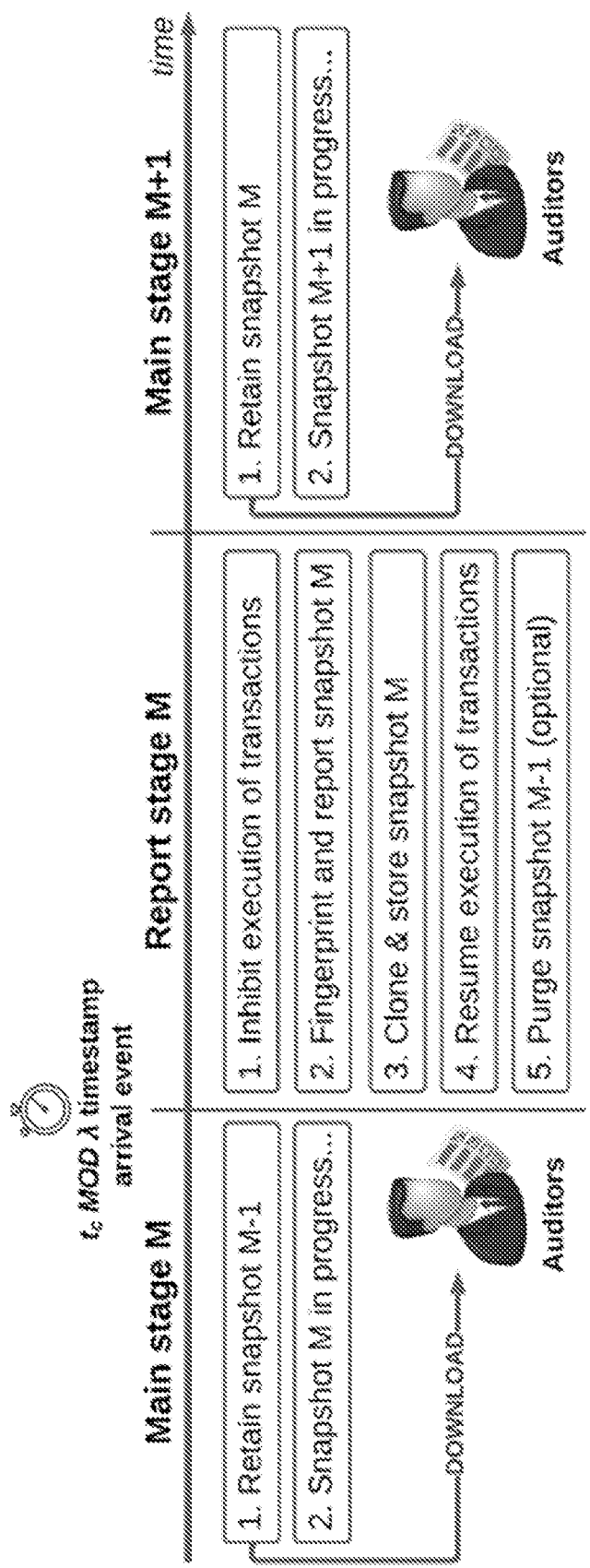
FIG. 6 is diagram illustrating an example of stage transitions according to the synchronicity aspects of the systems and methods disclosed herein.

Operation Lifecycle:

FIG. 6 shows an example cycle of functions for a Blockumulus embodiment that is deploying a given bContract. As shown, the cycle may involve an oscillation of two conceptual stages: main stage and report stage. In the main stage, which may be longer than the report stage, Blockumulus actively accepts and processes incoming transactions that shape the current data snapshot. The transactions will be processed according to the bContract provided by the user for the given type of transaction. During the main stage, auditors may optionally download the previous data snapshot (i.e., the data snapshot for the transactions processed during the previous period) for review and storage. In the report stage, Blockumulus accepts transactions, but instead of executing them, it queues them in a buffer. Once the current snapshot is fingerprinted, Blockumulus continues executing incoming and queued transactions. Also, as soon as the fingerprint is ready, the cell saves it in the smart contract. However, at this point, the execution of the incoming transactions resumes because the execution inhibition is needed only for calculating the fingerprint, not for smart contract submission.

In some embodiments, the Blockumulus framework may generate data snapshots and data fingerprints in the main stage only for transactions of a given bContract, or a set of bContracts, a category of types of bContracts (e.g., all bContracts for a given client or class of clients). Likewise, data snapshots can be made available publicly to any interested auditor, or only to specified auditors (e.g., all data snapshots for bContracts relating to voting may be made available only to governmental auditors like elections commissions).

Figure 7:
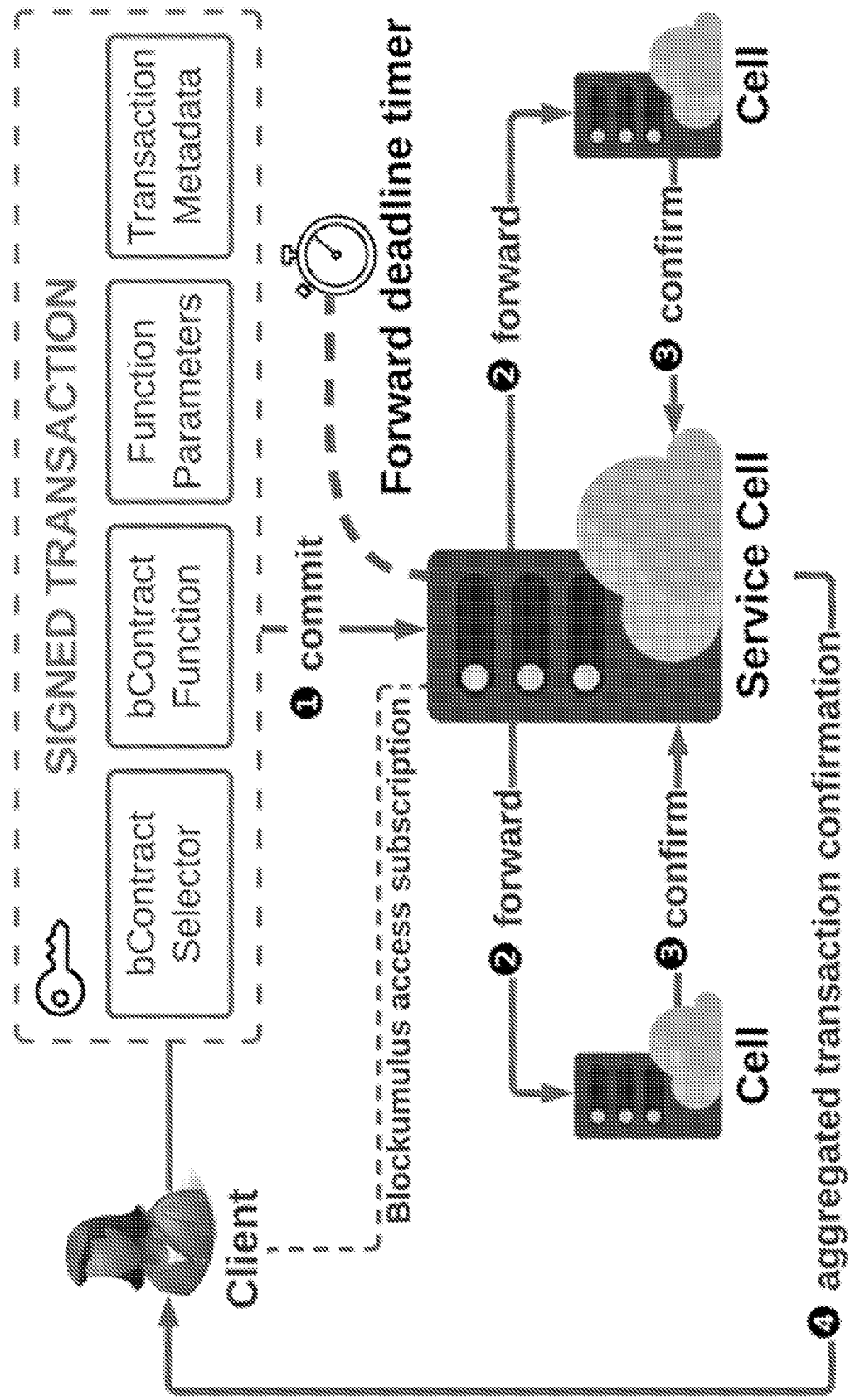
FIG. 7 is a block diagram showing process and data flow among various components of a system according to the present disclosure, for a given transaction.

Transactions:

FIG. 7 shows a general overview of a Blockumulus transaction. The transaction begins with a client creating a transaction message M, which is signed and sent to a given Blockumulus cell, called the service cell. In some embodiments, the service cell may be operated by a provider with which the client has an access subscription (with some or all of the other cells in the consortium being operated by another provider). In other embodiments, all cells may be operated by the same provider. The service cell first authenticates the transaction by confirming that the transaction message is signed by the user with the same identity (public address) as the one found in the transaction message. Then, the service cell forwards the transaction to all the other cells in the consortium. After that, the cells of the consortium verify and execute the transaction, just as the service cell does, and send a signed confirmation back to the service cell within a pre-determined short time frame. Thus, the cells need not all act in perfect synchrony, but rather all have a synchronous deadline for returning the signed result of a transaction. If the forwarded transaction is not processed by all cells until the established deadline, the transaction reverts. If a cell misses the deadline more often than a pre-determined threshold, it is temporarily excluded from the consensus upon mutual agreement with the other cells. Finally, the service cell verifies the fingerprints of the resulting data snapshots reported by the other cells, and executes the transaction by itself. In other embodiments, the service cell may process the transaction at the same time as the other cells. And, still other embodiments of the Blockumulus framework may allow cells other than the initial service cell to determine whether there is consensus among the cells that calculated the fingerprint. Where all cells are part of the same network or cloud resource, the role of a "service cell" may not be necessary, and a separate application may route transactions to a given consortium of cells for a given class of bContract. If the result of the execution matches the fingerprints reported by the other cells, the service cell serializes the confirmations into an aggregated receipt, and sends it to the client as a reply to the initial commit request, which constitutes the transaction confirmation event with a multi-signature cryptographic proof (as further described below).

Referring to FIG. 7, a client may create a transaction and commits it to a given Blockumulus cell with which the client has a Blockumulus access subscription; the service cell verifies the authenticity of the transaction, and forwards it to all the other cells in the consortium; the cells of the consortium process the transaction and send a signed confirmation back to the service cell within a strict deadline; the service cell executes the transaction, serializes the confirmations into an aggregated receipt, and sends it to the client as a reply to the initial commit request.

Incentive for Cooperation:

Optionally, a Blockumulus framework may provide for an incentive to attract cooperation. Here, the incentive for cooperation is discussed through the P2P network perspective. Unlike in public Blockchain consensus (e.g., Nakamoto consensus), Blockumulus is designed in a way to encourage cooperation and make cheating unbeneficial. The combination of synchronous execution, fixed cell topology, open data, transparent execution, and payment model separated from consensus create an arrangement in which cells have no incentive to cheat. Moreover, each cell benefits from fast and successful execution of transactions by all other cells in the system. The following theorem confirms that competition for voting power, typical for blockchains, is not pertinent to Blockumulus.

Theorem 1: The minimum required number of valid cells in Blockumulus overlay consensus is the same for all $M \geq 2$. Proof: As per design of Blockumulus, the auditor software verifies that the deployment has at least one cell i that maintains the succession of reported snapshots $S_{i,j}$ and correctness of the corresponding smart contract reports $R_{i,j}$, i.e.:

$$\exists\, 1 \leq i \leq M\, \forall\, 1 \leq j \leq \frac{t_c\, MOD\, \lambda - t_0}{\lambda}: \quad \text{Eq. 2}$$

$$S_{i,j}\overrightarrow{\text{succession}}S_{i,j+1} \wedge H(S_{i,j}) = R_{i,j},$$

where H is the hash function used for fingerprinting in Blockumulus. Suppose that M=2, one cell is valid, while all other cells may or may not be compromised or cheating. In this case, Equation 2 evaluates to "true", because either Cell 1 is valid, or Cell 2 is valid, or both of them are valid. Now, suppose that M=Q (Q>2), and one cell is valid, while all other cells may or may not be compromised or cheating. In this case, Equation 2 again evaluates to "true", because there is a cell with an index in the range [1, Q], which maintains succession of snapshots and correctness of the fingerprint reports. Therefore, the minimal number of cells required for the overlay consensus is 1.

Scalability Analysis

The aspects of the various systems and methods described herein that allow for greater scalability than standard Blockchain systems will now be described through an asymptotic complexity analysis.

First, an example will be discussed in which it is assumed that K clients submit N successful transactions to a Blockumulus deployment with M cells. The symbol c is used to denote a constant value that does not grow as the system scales. Unlike standard Blockchain systems, in which an increase of the number of nodes benefits decentralization, the Blockumulus overlay consensus requires only one valid cell to sustain normal operation, including prevention of conflicting transactions, such as double spending. As per Theorem 1, adding more cells does not enhance the decentralization of a Blockumulus deployment. Thus, the number of cells M is not required to be scalable, nor is its scalability assumed. However, using multiple cells in Blockumulus provides other advantages, such as enhancing availability of the system through replication and increasing the diversity of Blockumulus access providers.

Transaction Latency.

Transaction latency is the total delay experienced by the client between the initiation of a transaction until the confirmation of its completion. The cumulative transaction delay in the system, denoted $L_{delay}$, can be expressed as:

$$L_{delay} = N \cdot \left(D_1 + \max_{i=2}^{M}(D_i + D_i^*) + D_c\right) \quad \text{Eq. 3}$$

where $D_1$ is the delay of sending a transaction to the service cell, $D_i$ is the delay in forwarding the transaction to cell i, $D_i^*$ is the delay of response from cell i to the service cell, and $D_c$ is the delay of sending the response to the client. We also assume that $D_i + D_i^* < \delta$ for all i>1, where $\delta$ is maximum transaction forwarding delay. In one embodiment, each of the N transactions begins with the client sending it to the service node, which simultaneously forwards the transaction to all the other cells, followed by an immediate parallel response from these cells to the service cell. Then, it finishes by sending the aggregate response to the client from the service cell. Now, since $D_1$, $\delta$, and M do not grow with increased number of transactions, the transaction latency complexity can be presented as:

$$L_{delay} = N \cdot (c + c \cdot c + c) = O(N) \quad \text{Eq. 4}$$

Therefore, the transaction latency in Blockumulus grows linearly with the number of transactions. As will be described further below, transaction latency can remain low even when cells are implemented via low-tier services with extreme transaction load.

Communication Overhead.

Transaction communication overhead is the cumulative amount of data transferred within Blockumulus in the course of N transactions. The communication overhead $L_{data}$ of N Blockumulus transactions can be expressed as follows:

$$L_{data} = N \cdot \Big[H_c + P_c + \quad \text{Eq. 5}$$
$$(M-1) \cdot (H_1 + H_c + P_c) + \sum_{i=2}^{M}(H_i + P_i) + \sum_{i=1}^{M}(H_i + P_i)\Big]$$

where Hc is the header sent by a client, Pc is the payload sent by a client, Hi is the header sent by a cell i, and Pi is the payload sent by the cell i. Since headers and payloads of messages do not become bigger with more transactions, and the number of cells remains constant, Eq. 5 can be reduced as:

$$L_{data} = N \cdot [2c + c \cdot 3c + c \cdot 2c + c \cdot 2c] = O(N) \quad \text{Eq. 6}$$

Therefore, as the number of transactions grows, the communication overhead also experiences a linear increase. However, through design and experiments, the inventors have shown that this complexity is practically amenable and does not lead to bottlenecks even under an extreme transaction load.

Data Storage.

Each transaction in Blockumulus requires some degree of data that must be stored by each cell. Thus, the transaction can be thought of as having a data footprint $U_i$, which is replicated across participating cells, and also appears in three snapshots: the snapshot currently being built, and also two previous snapshots left for auditing. The data storage can be written as $L_{storage} = 3 \cdot M \cdot \Sigma_{i=1}^{N} U_i$. Since the number of cells M and each of the size of stored data items $U_i$ do not grow with the increasing number of transactions and users, the following reduction takes place:

$$L_{storage} = 3 \cdot c \cdot N \cdot c = O(N) \quad \text{Eq. 7}$$

Therefore, the complexity of the stored data is linear with respect to the number of transactions.

Computation.

To assess computational scalability of a Blockumulus embodiment, the processes performed both by cells and by auditors should be taken into account. It can rationally be assumed that the number of auditors is linearly proportional to the number of users K, i.e., that a certain percentage of users serve as auditors. Then, the cumulative computation overhead can be represented as:

$$L_{compute} = K \cdot \sum_{i=1}^{N}(C_i) + M \cdot \sum_{i=1}^{N}(C_i) \qquad \text{Eq. 8}$$

where $C_i$ is the amount of computation required for processing a single transaction i on a single computer. Since each computation load and the number of cells remain the same with growing number of transactions and users, the following reduction can be performed:

$$L_{compute} = K \cdot N \cdot c + c \cdot N \cdot c = O(KN) \qquad \text{Eq. 9}$$

Therefore, the computational overhead of a Blockumulus implementation has a linear dependency upon both the number of users and the number of transactions, which suggests that cells of a consortium may need to proportionally increase their compute power as the number of users grows.

Snapshot Reporting.

In some embodiments, each Blockumulus cell reports fingerprints to the smart contract with constant frequency $$F = \frac{1}{\lambda}.$$

By representing the report timeline through R, the Blockchain fee overhead is as follows: $L_{fee}$=M·R·F. Since the number of cells M is fixed, the fee does not change over time, and the report frequency is also fixed, i.e., $L_{fee}$=c·c·c= $O(1)$). Therefore, as a Blockumulus deployment grows, the fee overhead remains in the same order Security Analysis Various types of security threats will now be discussed, along with their impact on Blockumulus, and how the systems and methods described herein address these threats.

Double Spending.

A double spending situation is one in which two mutually exclusive transactions are executed by a distributed system, such as repeated transfer of the same cryptocurrency balance. Consider a situation in which Alice, who has 10 crypto coins, creates a transaction that sends 10 coins to Bob, and another transaction with identical timestamp that sends 10 coins to Charlie. After that, Alice simultaneously submits one of these transactions to Blockumulus through Cell 1, and another one through Cell 2. Assume that the transaction storage of Blockumulus is properly implemented with a mutex-based storage (i.e., the one that does not permit simultaneous writing operations), which can be achieved through file locks or ACID databases. The two transactions will be saved in the ledger in the order of their arrival. Subsequently, the transaction that is executed second will be rejected, effectively preventing the double spending. Furthermore, Blockumulus transactions are executed synchronously or with synchronous deadlines by all cells. Unlike Blockchain which allows a temporary partition into peers that have already processed a transaction and peers that have not, Blockumulus prohibits temporary asynchrony using the synchronous execution with a mutex-based storage. Therefore, the situation where Bob received 10 coins from Alice according to one cell and Charlie received 10 coins according to another cell is impossible.

Transactions Filtering Attack.

The cells of the various embodiments disclosed herein might prevent routing of a certain transaction to a bContract due to a transactions filtering attack. For example, consider a bContract that re-invests dividends if an investor fails to withdraw them until a certain deadline. The invested business might bribe the cloud consortium to filter out the withdrawal transaction—in which case the auditors will not be able to detect any anomaly. In Blockumulus, this issue is addressed by enforcing the execution of a transaction via a smart contract platform. If a transaction is censored, it can be submitted directly to the smart contract, and the system protocol stipulates the necessity to execute all transactions submitted in this way. Since the smart contract is not under any party's control, users have the ability to enforce a transaction even when Blockumulus has only one operational cell.

Systems implementing a Blockumulus framework are programmed such that the cells are unable to falsify data—rather, they simply process transactions. If any one cell attempted to falsify data or return an incorrect transaction result, it would simply be excluded from the fingerprint. In an unlikely scenario in which all cells conspired to ignore or modify the execution of an incoming transaction, or generate a false transaction, mechanisms are available to force the correct transaction to be processed. In order eliminate such a scenario, the third party smart contract (to which the fingerprint is sent), such as the Ethereum smart contract, is used to control the execution of Blockumulus and may have a function for enforcing a transaction. It may work as follows:

1. The client (or third party user involved in the transaction) observes a consortium-wide censorship (filtering, ignoring, modifying, falsifying, etc.) of their transaction. For example, a gift card balance is not lowered after a purchase, or a vote for a given candidate is ignored.
2. The client contacts the transaction enforcement function of the smart contract and submits the transaction through this function. In some scalable embodiments, this can be an automated option for customers, in which the framework provider integrates into the customer portal an option to trigger the third party smart contract's transaction enforcement function.
3. The transaction enforcement function of the third party smart contract records the transaction in the smart contract, which the consortium cells of the framework cannot control or censor.
4. In some implementations, a protocol of the scalable framework may stipulate that all the transactions submitted through the smart contract's transaction enforcement function must be executed by the cells. If the cells fail to execute the transaction, they violate the overlay consensus and can no longer be trusted as per the protocol.

Consortium Conspiracy.

In operation, users may fear that cells of a Blockumulus implementation might conspire to tamper with the data snapshots in three possible ways: 1) by modifying an existing transaction, 2) by removing an existing transaction, or 3) by injecting a new transaction. If an existing transaction is modified, it will immediately break the verification of the transaction signature generated by the sender. If an existing transaction is removed before the report is submitted to the smart contract, the receipt of this transaction signed by the cell becomes the proof of malice by the cell. Finally, if a new transaction is added before the report, it is a legitimate way to change data in the snapshot and does not need to be defended against. Another type of consortium conspiracy is a system-wide subscription ban of a user by all Blockumulus providers. Fortunately, this type of conspiracy can be easily prevented in the same way as in the case of transaction filtering attack (see above), i.e., by letting users submit contingency transactions to the smart contract.

Compromised Cells.

An attacker might compromise one or several Blockumulus cells to skew the overlay consensus. In a worst-case scenario, the attacker gained full access to the majority of cells in a Blockumulus deployment to cause the Byzantine Fault event. In this case, a consensus node cannot verify the true state of the system based on the testimonies from the other nodes. However, Blockumulus is not prone to the Byzantine Fault scenario, because the smart contract, deployed on a Byzantine Fault Tolerant (BFT) Blockchain, prevents the cells from delivering inconsistent testimonies to different parties.

Evaluation

Transaction Latency:

The inventors evaluated the transaction latency of the Blockumulus deployment by measuring the time between submitting a transaction until the acquisition of the receipt. The inventors conducted two latency evaluation tests: distribution of delays of standalone transactions under normal load, and transaction latency under the load of a large number of simultaneous transactions.

Figures 8A, 8B, 8C:
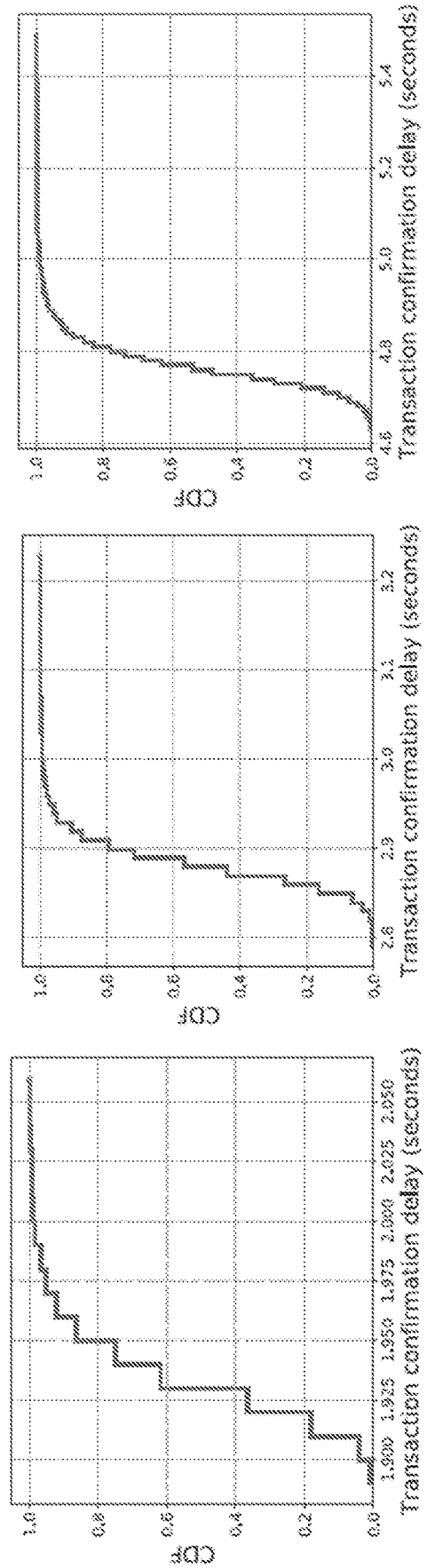
FIGS. 8A-8C are example graphs showing transaction latency for different implementations of the systems described herein.

The results of the first experiment are shown in FIGS. 8A-8C. FIGS. 8A-8C shows transaction latency for FastMoney funds transfer with different sizes (2 cells for FIG. 8A, 4 cells for FIG. 8B, and 8 cells for FIG. 8C) of cloud consortia based on 500 requests. In this experiment, the inventors measured transaction latency for the funds transfer in FastMoney bContract with the sizes of the cloud consortia of 2, 4, and 8 cells. For each consortium size the inventors executed 500 consecutive transactions and measured their confirmation delays. When the size of consortium is 2, 90% of transactions execute in under 2 seconds. When the size of consortium is doubled, the upper boundary of the confirmation delay of 90% of transactions increased by around 50%, which is slower than the increase of the number of cells. By doubling the number of cells again up to 8, 90% of transactions finished in under 5 seconds, which is around 66% greater than in the case of 4 cells. Thus, the result is indicative that the growth of the transaction latency is slower than the number of cells.

Figures 9A, 9B, 9C:
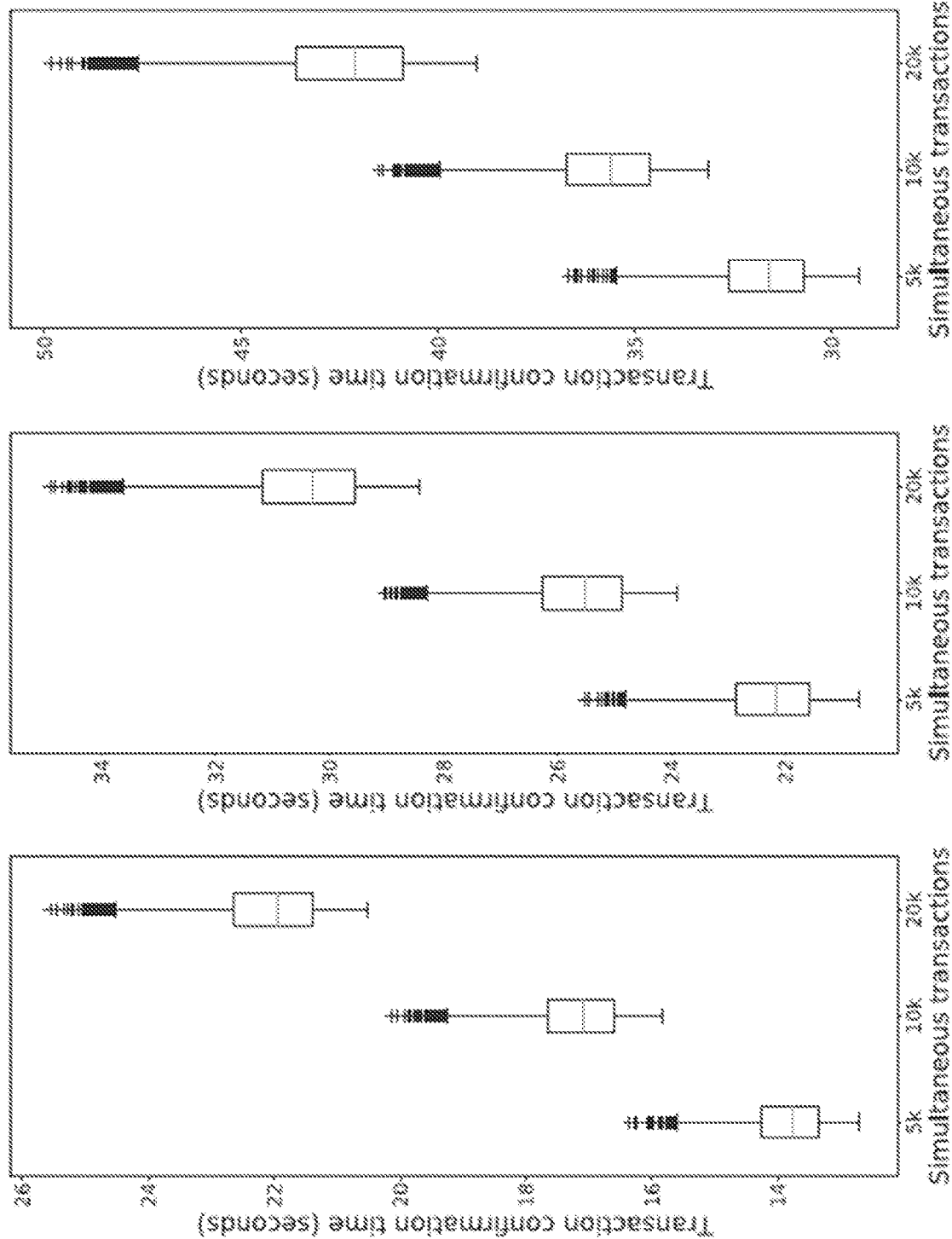
FIG. 9 is a set of graphs showing transaction latency for simultaneous CAS uploads, via different implementations of the systems described herein.

In the second transaction latency measurement, the inventors conducted a stress test with multiple transactions issued at the same time. for this experiment, the inventors used the CAS system bContract, and ran 9 experiments: with 5,000, 10,000, and 20,000 transactions, for each of the consortia sizes seen in the previous experiment, i.e., 2 cells, 4 cells, and 8 cells. similar to the previous experiment, in each configuration, as the number of transactions doubles, the transaction confirmation time increased by a lesser factor. FIGS. 9A-9C shows transaction latency for simultaneous CAS upload requests with different sizes (2 cells for FIG. 9A, 4 cells for FIG. 9B, and 8 cells for FIG. 9C) of cloud consortia.

Communication Overhead:

Table II shows the TCP overhead observed in Blockumulus while processing a transfer transaction with FastMoney bContract. In order to observe the communication between cells, the inventors created a 2-cell Blockumulus deployment on a local machine and run WireShark, in which we use the Follow TCP Stream function to observe the cumulative traffic of each communication for each direction. The results shows that, in the worst case, the largest communication is around 4 Kbytes per transaction in downlink direction. A speed test using the Ookla software on several Azure servers revealed the available bandwidth around 8.5 Gbps in the downlink direction and around 1 Gbps in the uplink direction. Since the overhead of a FastMoney transaction does not exceed 4 Kbyte, the 1 Gbps server bandwidth is capable to transfer the data of more than 30,000 transactions per second, which exceeds the average throughput of all credit card transactions in the world.

TABLE I

Communication overhead in FastMoney (bytes)

| Communication | 2 CELLS | | 4 CELLS | | 8CELLS | |
| --- | --- | --- | --- | --- | --- | --- |
| | in | out | in | out | in | out |
| CL↔C: fingerprint | 1,200 | 516 | 2,179 | 516 | 4,135 | 520 |
| CL↔C: payment | 1,140 | 559 | 2,059 | 559 | 3,895 | 563 |
| CL↔C: forward | 667 | 947 | 667 | 946 | 667 | 947 |

CL↔C: BETWEEN CLIENT AND CELL;
C↔C: between two cells

Figure 10:
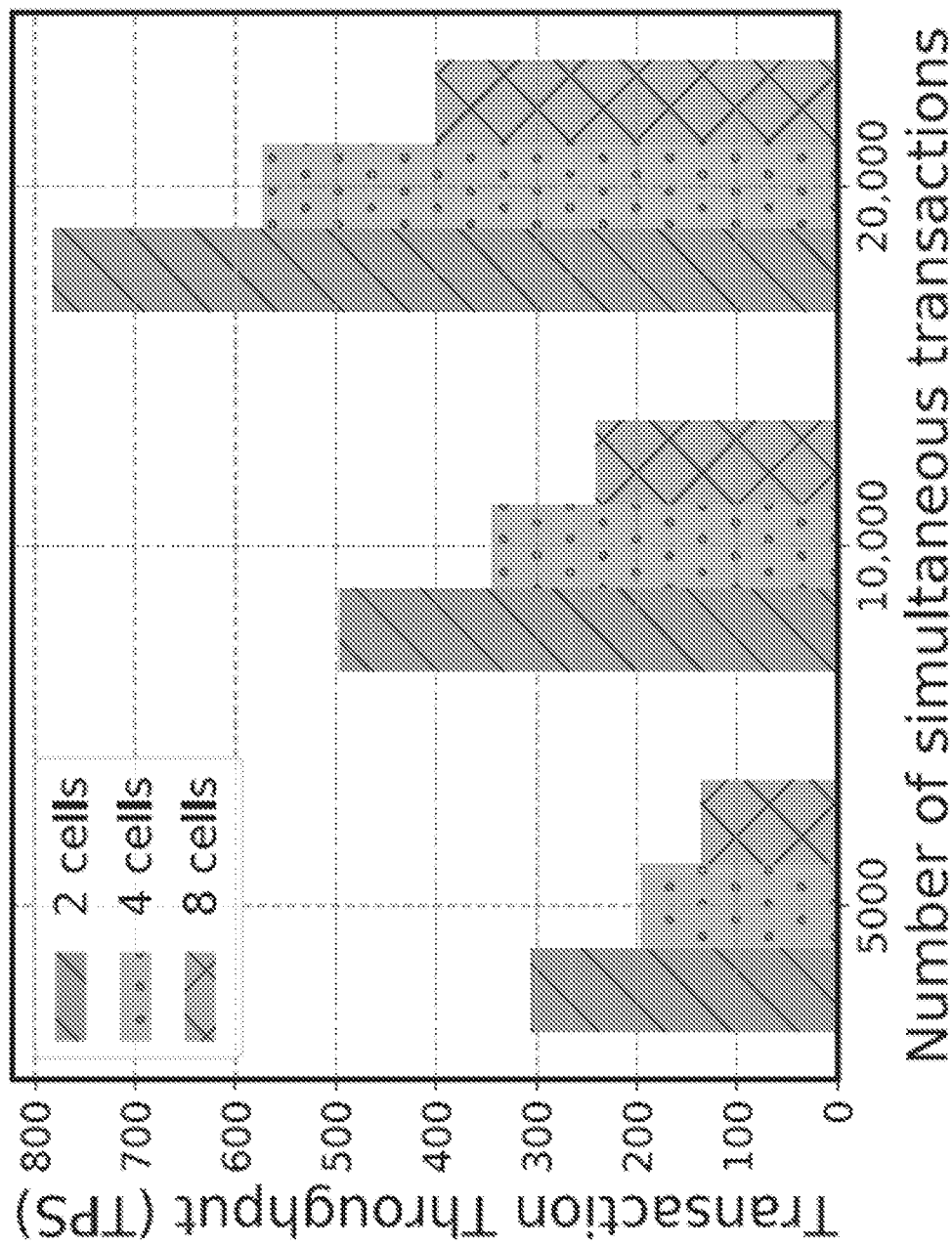
FIG. 10 is a graph showing transaction throughput for different implementations of the systems described herein.

Transaction Throughput:

For this evaluation, the inventors transferred a small amount of funds from one FastMoney account into another, measuring the full delay between the submission of the transaction until receiving the confirmation. The inventors did not generate any failing transactions, nor did the inventors observe any failures during the stress test. The inventors ran 9 experiments, matching three deployment configurations (2, 4, and 8 cells) with three sizes of transaction load (5,000, 10,000, and 20,000 simultaneous transactions), with the result shown in FIG. 10. The result demonstrates that: while the increased number of cells reduces the transaction throughput, the growing number of transactions makes the throughput larger, which is expected because the latency is growing slower than the number of simultaneous transactions, as was shown earlier. The inventors attributed this "bulk discount" effect to the benefits of parallel execution, caching, and a significant reserve of available bandwidth due to the low communication overhead of Blockumulus.

Operation Cost:

Blockumulus delivers transaction performance similar to credit card providers, alongside with decentralization properties seen in cryptocurrencies such as Bitcoin. This reconciliation of performance and decentralization comes at a price of delayed final settlement of transactions. Specifically, any confirmed transaction hinges upon trust towards the cells until the corresponding snapshot is submitted to the Ethereum smart contract. Therefore, the frequency of snapshot reports defines the speed of final irreversible settlement of recent transaction sets in Blockumulus. Table III shows how much each of the participating clouds will pay in Ethereum fees in 24 hours for data validation based on the frequency of can balance cost and frequency of reports. For comparison, the average price per Ethereum transaction on Jan. 13, 2021 is $5.72, with approximately 1,000 daily transactions. With the same number of daily transactions, the Blockumulus fee overhead per transaction would be 218.08/1000=$0.218 with 10-minute report frequency, which is about 26 times less than that in Ethereum. Moreover, the more subscribers a Blockumulus cell has, the lesser the amount of money is required per user to cover the reporting fee. For example, if a Blockumulus cell has 10,000 active subscribers, the monthly reporting fee overhead per user would be only $0.65. The inventors did not add the cost of auditing to the overall cost because cross-auditing is already a part of the normal cell operation, and the third-party auditing does not incur any expense for Blockumulus cell operators.

TABLE II

Cost of Blockumulus smart contract fees for participating cloud services based on the report period

| Report Period | Cost per 24 hours per cloud provider | |
|---|---|---|
| | Gas | Approx. USD |
| 10 min | 7,083,792 | 218.08 |
| 30 min | 2,361,264 | 72.69 |
| 1 hour | 1,180,632 | 36.35 |
| 8 hours | 147,579 | 4.54 |
| 24 hours | 49,193 | 1.51 |

With the market price of Ether $733 and gas price 22 GWei.

Flowchart

Figure 11:
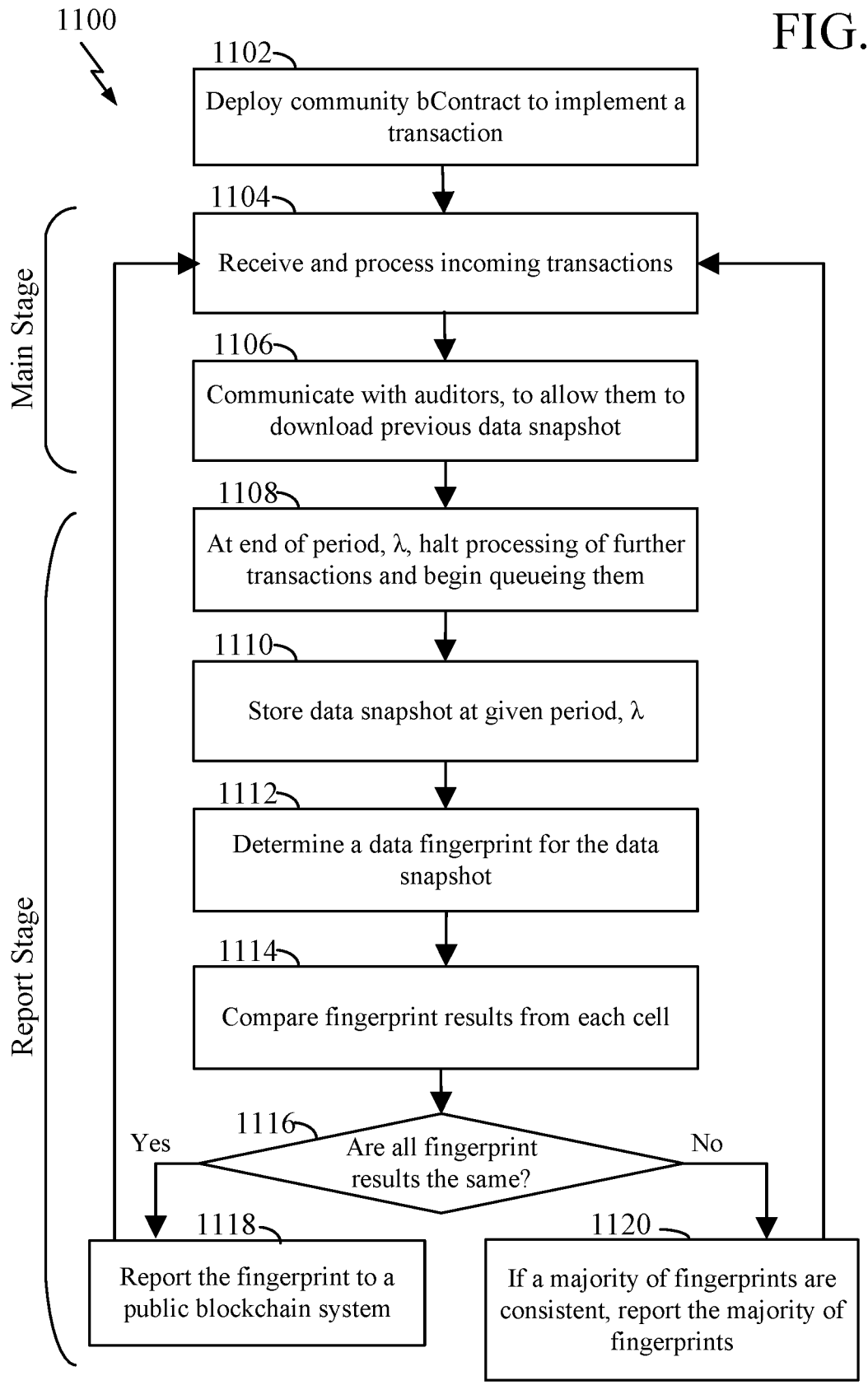
FIG. 11 is a flowchart illustrating an example method for operation of a scalable framework according to the present disclosure.

Referring now to FIG. 11, a flowchart is shown chart illustrating an example process for smart contracts on a scalable framework, in accordance with some aspects of the present disclosure. As described below, a particular implementation may omit some or all illustrated features and may not require some illustrated features to implement all embodiments. In some examples, the scalable framework may carry out the process 1100. The scalable framework (e.g., Blockumulus) is a framework that builds a decentralized environment for executing smart contracts upon a set of cells, such as nodes of a cloud consortium, synchronized by the overlay consensus. In other examples, any suitable computational resource or apparatus that can supply sufficient communication and computational capabilities for carrying out the functions or algorithm described below may carry out the process 1100.

In step 1102, the scalable framework may deploy a decentralized computing model (e.g., a community bContract) to implement a transaction. The bContract is defined and/or provided by a client, as described above, and integrated into the scalable platform. Steps 1104-1106 discuss a main stage of the scalable framework while steps 1108-1122 describe a report stage of the scalable framework.

In step 1104, a cell in a cloud consortium in the scalable framework may receive and process incoming transactions for a predetermined period of time. In some examples, the cloud consortium may include a predefined set of network cells on the cloud. The number of network cells may be sufficient to guarantee the availability of the system, but it does not need to be too large (i.e., 10 or less) to avoid performance degradation. In further examples, the cloud consortium may include centralized cloud computing nodes on the cloud. The network cell actively accepts and processes incoming transactions, and the resulting output/data begins to shape a current data snapshot. Each cell of the framework processes and verifies each transaction. For example, a network cell in the framework can verify an authenticity of the incoming transaction message(s) by comparing first user information in the incoming transaction message(s) to second user information signing the incoming transaction message(s). In some examples, the cell may verify an incoming transaction message by confirming that the transaction message is signed by the user with the same identity (public address) as the one found in the transaction message. All incoming transactions are recorded, and each transaction input(s) should result in a uniform output across all cells. In other words, if processes experience no errors, cheating, attacks, or faults, the existence of two conflicting transaction results in different cells is ruled out. These transactions may be executed immediately by the consortium of cells.

In some embodiments, the network cell in the cloud consortium may be a service cell. The service cell may receive one or more transaction messages and for a predetermined period of time and forward the one or more transaction messages to other cell(s) in the cloud consortium. The other cell(s) in the cloud consortium may verify and execute the one or more transactions and send confirmations indicative of execution of the one or more transaction messages within the predetermined period of time. Then, the service cell can receive the one or more confirmations indicative of execution of the one or more transaction messages. The service cell may verify one or more fingerprints of the one or more cells reported to a public blockchain system (e.g., Ethereum smart contract.) and process the one or more transaction message in response to the one or more fingerprints of the other cell(s). However, it should be appreciated that the service cell may process the one or more transaction messages before receiving the one or more confirmations from the other cell(s).

In other embodiments, the network cell may be a network cell other than the service cell in the cloud consortium. The network cell may receive one or more transaction messages and process the one or more transaction messages for a predetermined period of time. In addition, the network cell may verify the received one or more transaction messages. The network cell may transmit a confirmation indicative of execution of the one or more transaction messages to the service cell.

In some examples, the scalable framework may perform operations via system bContracts to assist in processing transactions. A system bContract delivers essential functionality to the system. The scalable framework may include two system bContracts: community bContract deployer, and content-addressable storage (CAS). The community bContract deployer serves as an interface for developers to add their community bContracts to scalable framework. The CAS contract allows to store large files outside of data models of community bContracts, and establishes a secure communication channel between bContracts, which are otherwise autonomous and isolated.

In step 1106, the network cell may communicate with auditors, to allow them to download the previous data snapshot.

In step 1108, at the end of the predetermined period of time, λ, the network cell may halt processing of further transactions and begin queueing them. That is, in the report stage, the scalable framework accepts transactions, but instead of executing them immediately as done during the main stage, it queues them in a buffer.

In step 1110, the network cell may store a data snapshot at the given period, λ. A data snapshot can be configured in several ways, such as having the snapshot be the cumulative state of data of all participating bContracts at a given timestamp, or the state of just those bContracts that processed transactions during a given period. Each data snapshot is then fingerprinted, and a data snapshot fingerprint may include a single hash combining all the fingerprints reported by the cells for the bContract. In some examples, the network cell may store a current data snapshot in the decentralized computing model (e.g., bContract) based on the one or more processed transactions.

In step 1112, the network cell may determine a data fingerprint for the current data snapshot. For example, the network cell may fingerprint the current data snapshot to produce a data fingerprint of the decentralized computing model (e.g., bContract). In some examples, the data fingerprint of the decentralized computing model may include a hash of the current data snapshot. In further examples, the fingerprint comprises a hash of the current data snapshot in the decentralized computing model and another current data snapshot of another decentralized computing model. In even further examples, the fingerprint comprises a hash of the current data snapshot in the decentralized computing model and a previous report corresponding to a previous data snapshot of the decentralized computing model. In further examples, all the matching fingerprints from all bContracts from other cell can be combined together in a Merkle tree to produce the overarching Blockumulus data snapshot that is submitted to the Ethereum smart contract. A data snapshot fingerprint is the root of the Merkle tree of the data snapshot for a given timestamp. However, at this point, the execution of the incoming transactions could resume because the execution inhibition is needed only for calculating the fingerprint, not for smart contract submission.

In step 1114, the network cell may compare the data fingerprint to the fingerprints reported from other cell(s) in the cloud consortium.

In step 1116, the network cell may determine whether the fingerprint(s) from the other cell(s) are the same.

If all fingerprint(s) are the same as the fingerprint of the network cell in step 1116, then in step 1118, the network cell may report the fingerprint to the public block chain system. For example, the network cell may store the fingerprint or a concatenation or combination of all fingerprints, in a smart contract platform (e.g., Ethereum). In one embodiment, the data fingerprints from all bContracts are combined onto a single fingerprint (e.g., a single 256 bit fingerprint) using the Merkle tree algorithm. This resulting fingerprint may represent the cryptographic summary of all the valid fingerprints of individual bContracts of cells in the cloud consortium, and may be submitted to the smart contract. Then, the network node may go back to step 1104.

If all fingerprint results are not the same in step 1116, then in step 1120, the scalable framework may exclude inconsistent results and store the majority fingerprint value in smart contract platform. For example, the data fingerprint of the service cell or a combination of fingerprints of the network cells may be reported in response to the data fingerprint matched to the one or more data fingerprints from other cell(s). In some embodiment, the data fingerprint may be reported in response to the fingerprint matched to a subset of the one or more data fingerprints. The subset may be more than a majority number of the one or more fingerprints. A mismatching cell corresponding to a mismatching fingerprint of the fingerprint(s) from other cell(s) may be removed from the cloud consortium. The mismatching fingerprint might not be matched to the fingerprint of the service cell. In some examples, a majority of fingerprints of the network cells may be consistent. The cells with mismatching fingerprints can be excluded from the consensus, and timely fingerprint reports can be guaranteed even if some contracts are unable to establish consensus within their respective contexts. The goal of each bContract is to assure that a transaction is executed identically across all the cells. To enforce this, after each transaction, the called bContract produces a fingerprint of its current data. If the fingerprints do not match, the bContract is temporarily excluded from the snapshot. As a result, each transaction entails an identical state transition of each cell in scalable framework. If a cell becomes irresponsible or fails the verification, it is excluded from the consensus until the next report cycle. Then, the network cell may go back to step 1104.

Various designs, implementations, and associated examples and evaluations of a system and method for processing electronic transactions are described above. However, it is to be understood the present invention has been described in terms of one or more preferred embodiments, and it should be appreciated that many equivalents, alternatives, variations, and modifications, aside from those expressly stated, are possible and within the scope of the invention.

USE CASE 1: Inter-bank transaction processing system. Multiple banks can exchange funds by deploying a bContract on Blockumulus and submitting transactions to this bContract. Different from traditional inter-banking transaction clearing services, such as SWIFT, VISA, or MasterCard, the Blockumulus-based solution allows a decentralized transaction clearing decision, so that a single corporation or jurisdiction cannot make unilateral decisions. Therefore, the operation of Blockumulus-based solution does not depend on the trust of a central authority. The Blockumulus-based solution achieves a transaction throughput satisfying the current and future transaction clearing demands.

USE CASE 2: Federal, municipal, or corporate elections. National governments, local municipalities, and corporations can use Blockumulus for running elections with cryptographically verifiable and auditable digital artifacts. Compared with the traditional electronic election solution, the Blockumulus-based solution guarantees cryptographically verifiable transparency, while preserving the privacy of voters. Specifically, every voter can verify that their vote has been counted, while no one, even the system administrators, can determine any individual vote. Moreover, the Blockumulus-based solution is scalable to support federal elections with hundreds of millions of voters. It should be appreciated that the application of the decentralized data processing model (e.g., bContract) on the scalable framework (e.g., Blockumulus) are not limited to the described use cases. The bContract can be used in any other suitable industry, practice, and organization.

Hardware Configuration Example

Figure 12:
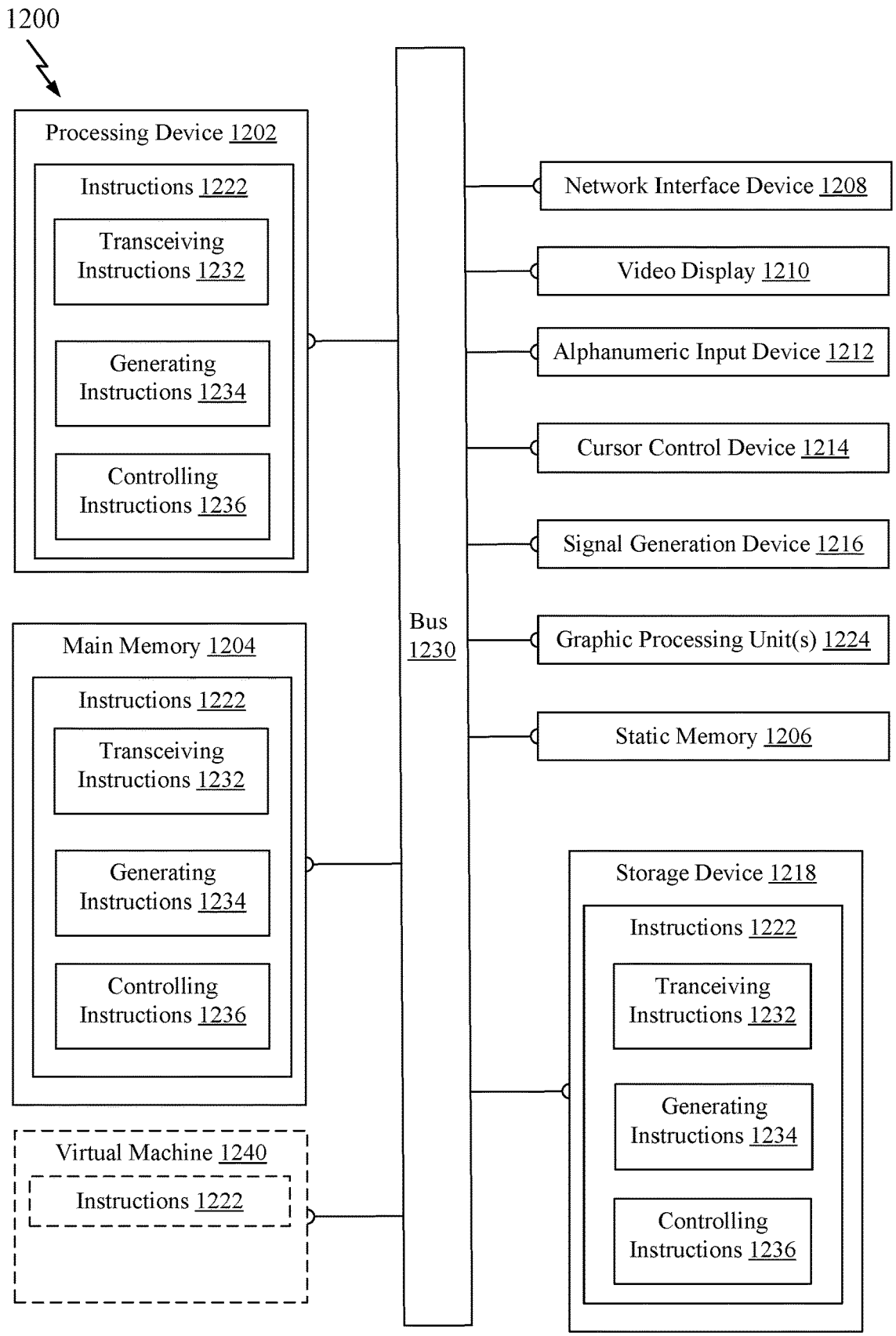
FIG. 12 is a block diagram conceptually illustrating an example of a hardware implementation for the methods disclosed herein.

FIG. 12 is a block diagram conceptually illustrating an example machine of a computer system 1200 within which a set of instructions, for causing the machine to perform any one or more of the methods disclosed herein, may be executed. In alternative implementations, the machine may be connected (such as networked) to other machines in a LAN, an intranet, an extranet, and/or the Internet.

The machine may operate in the capacity of a server or a client machine in a client-server network environment, as a peer machine in a peer-to-peer (or distributed) network environment, or as a server or a client machine in a cloud computing infrastructure or environment. The machine may be a server computer, a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methods discussed herein.

The example computer system 1200 includes a processing device 1202, a main memory 1204 (such as read-only memory (ROM), flash memory, dynamic random access memory (DRAM) such as synchronous DRAM (SDRAM) or DRAM, etc.), a static memory 1206 (such as flash memory, static random access memory (SRAM), etc.), and a data storage device 1218, which communicate with each other via a bus 1230.

Processing device 1202 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 2302 is configured to execute instructions 1222 for performing the operations and steps discussed herein.

The computer system 1200 may further include a network interface device 1208 for connecting to the LAN, intranet, internet, and/or the extranet. The computer system 1200 also may include a video display unit 1210 (such as a liquid crystal display (LCD) or a cathode ray tube (CRT)), an alphanumeric input device 1212 (such as a keyboard), a cursor control device 1214 (such as a mouse), a signal generation device 1216 (such as a speaker), and a graphic processing unit 1224 (such as a graphics card).

The data storage device 1218 may be a machine-readable storage medium 1228 (also known as a computer-readable medium) on which is stored one or more sets of instructions or software 1222 embodying any one or more of the methods or functions described herein. The instructions 1222 may also reside, completely or at least partially, within the main memory 1204 and/or within the processing device 1202 during execution thereof by the computer system 1200, the main memory 1204 and the processing device 1202 also constituting machine-readable storage media.

In one implementation, the instructions 1222 include transceiving instructions for deploying community bContract to implement a transaction at block 1102 of FIG. 11, receiving and processing incoming transactions at block 1104 of FIG. 11, communicating with auditors, to allow them to download previous data snapshot at block 1110 of FIG. 11 and/or reporting an aggregated transaction confirmation in response to the multiple current data snapshots at block 1116 of FIG. 11. The instructions 1222 may further include generating instructions 1234 for recording data snapshot at given period at block 1108 of FIG. 11. The instructions 1222 may further include controlling instructions 1236 for performing operations via system bContracts to assist in processing transactions at block 1106 of FIG. 11, at the end of period, halting processing of further transactions and begin queuing them at block 1112 of FIG. 11, and/or storing current data snapshots corresponding to cells in a blockchain system at block 1114 of FIG. 11.

While the machine-readable storage medium 1218 is shown in an example implementation to be a single medium, the term "machine-readable storage medium" should be taken to include a single medium or multiple media (such as a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media. The term "machine-readable storage medium" shall accordingly exclude transitory storage mediums such as signals unless otherwise specified by identifying the machine readable storage medium as a transitory storage medium or transitory machine-readable storage medium.

In another implementation, a virtual machine 1240 may include a module for executing instructions such as receiving instructions 1232, generating instructions 1234, and/or modifying instructions 1236. In computing, a virtual machine (VM) is an emulation of a computer system. Virtual machines are based on computer architectures and provide functionality of a physical computer. Their implementations may involve specialized hardware, software, or a combination of hardware and software.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "modifying" or "providing" or "calculating" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices. The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (such as a computer). For example, a machine-readable (such as computer-readable) medium includes a machine (such as a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A computer-implemented method for scalable decentralized transaction processing, the method comprising:
   receiving, at a cloud consortium, a decentralized smart contract for execution via the cloud consortium;
   receiving, at the cloud consortium, a set of transaction messages over a predetermined period of time;
   processing, at a network cell in the cloud consortium using the decentralized smart contract, the set of transaction messages;
   storing, at the network cell in the cloud consortium, a data snapshot indicative of a state of the decentralized smart contract after processing the set of transaction messages at the network cell;
   computing, at the network cell in the cloud consortium using a hash function and the data snapshot, a data fingerprint; and
   reporting, by the cloud consortium, the data fingerprint to a public blockchain system.

2. The method of claim 1, further comprising:
   verifying an authenticity of the set of transaction messages based on a key included in the set of transaction messages.

3. The method of claim 1, further comprising:
   processing, at a second network cell in the cloud consortium using the decentralized smart contract, the set of transaction messages to;
   storing, at the second network cell in the cloud consortium, a second data snapshot indicative of the state of the decentralized smart contract after processing the set of transaction messages at the second network cell;
   computing, at the second network cell in the cloud consortium using the hash function and the second data snapshot, a second data fingerprint; and
   verifying the data fingerprint by determining that the data fingerprint matches the second data fingerprint.

4. The method of claim 3, wherein the data fingerprint is reported to the public blockchain system in response to verifying the data fingerprint.

5. The method of claim 1, further comprising:
   receiving a second set of transaction messages after the predetermined period of time elapses;
   queuing the second set of transaction messages in a buffer; and
   after computing the data fingerprint, processing, at the network cell in the cloud consortium using the decentralized smart contract, the second set of transaction messages.

6. The method of claim 1, wherein the cloud consortium comprises centralized cloud computing nodes including the network cell.

7. A computing system for scalable decentralized transaction processing, the system comprising:
   memory comprising instructions; and
   processing circuitry coupled to the memory, the processing circuitry configured to execute the instructions to:
   receive, at a cloud consortium, a decentralized smart contract for execution via the cloud consortium;
   receive, at the cloud consortium, a set of transaction messages over a predetermined period of time;
   process, at a network cell in the cloud consortium using the decentralized smart contract, the set of transaction messages;
   store, at the network cell in the cloud consortium, a data snapshot indicative of a state of the decentralized smart contract after processing the set of transaction messages at the network cell;
   compute, at the network cell in the cloud consortium using a hash function and the data snapshot, a data fingerprint; and
   report, by the cloud consortium, the data fingerprint to a public blockchain system.

8. The system of claim 7, wherein the processing circuitry is further configured to execute the instructions to:
   verify an authenticity of the set of transaction messages based on a key included in the set of transaction messages.

9. The system of claim 7, wherein the processing circuitry is further configured to execute the instructions to:
   process, at a second network cell in the cloud consortium using the decentralized smart contract, the set of transaction messages;
   store, at the second network cell in the cloud consortium, a second data snapshot indicative of the state of the decentralized smart contract after processing the set of transaction messages at the second network cell;
   compute, at the second network cell in the cloud consortium using the hash function and the second data snapshot, a second data fingerprint; and verify the data fingerprint by determining that the data fingerprint matches the second data fingerprint.

10. The system of claim 9, wherein:
the data fingerprint is reported to the public blockchain system in response to verifying the data fingerprint.

11. The system of claim 7, wherein the processing circuitry is further configured to execute the instructions to:
receive a second set of transaction messages after the predetermined period of time elapses;
queue the second set of transaction messages in a buffer; and
after computing the data fingerprint, process, at the network cell in the cloud consortium using the decentralized smart contract, the second set of transaction messages.

12. The system of claim 7, wherein the cloud consortium comprises centralized cloud computing nodes including the network cell.

13. A non-transitory computer-readable storage medium having instructions stored thereon that, when executed by processing circuitry, cause the processing circuitry to:
receive, at a cloud consortium, a decentralized smart contract for execution via the cloud consortium;
receive, at the cloud consortium, a set of transaction messages over a predetermined period of time;
process, at a network cell in the cloud consortium using the decentralized smart contract, the set of transaction messages;
store, at the network cell in the cloud consortium, a data snapshot indicative of a state of the decentralized smart contract after processing the set of transaction messages at the network cell;
compute, at the network cell in the cloud consortium using a hash function and the data snapshot, a data fingerprint; and
report, by the cloud consortium, the data fingerprint to a public blockchain system.

14. The computer-readable medium of claim 13, wherein the instructions, when executed by the processing circuitry, cause the processing circuitry to:
verify an authenticity of the set of transaction messages based on a key included in the set of transaction messages.

15. The computer-readable medium of claim 13, wherein the instructions, when executed by the processing circuitry, cause the processing circuitry to:
process, at a second network cell in the cloud consortium using the decentralized smart contract, the set of transaction messages;
store, at the second network cell in the cloud consortium, a second data snapshot indicative of the state of the decentralized smart contract after processing the set of transaction messages at the second network cell; and
compute, at the second network cell in the cloud consortium using the hash function and the second data snapshot, a second data fingerprint.

16. The computer-readable medium of claim 15, wherein the instructions, when executed by the processing circuitry, cause the processing circuitry to verify the data fingerprint by determining that the data fingerprint matches the second data fingerprint.

17. The computer-readable medium of claim 16, wherein the instructions, when executed by the processing circuitry, cause the processing circuitry to report the data fingerprint to the public blockchain system in response to verifying the data fingerprint.

18. The computer-readable medium of claim 15, wherein the processing circuitry is further configured to execute the instructions to:
process, at a third network cell in the cloud consortium using the decentralized smart contract, the set of transaction messages;
store, at the third network cell in the cloud consortium, a third data snapshot indicative of the state of the decentralized smart contract after processing the set of transaction messages at the third network cell; and
compute, at the third network cell in the cloud consortium using the hash function and the third data snapshot, a third data fingerprint.

19. The computer-readable medium of claim 18, wherein the instructions, when executed by the processing circuitry, cause the processing circuitry to verify the data fingerprint by determining that the data fingerprint matches the second data fingerprint or the third data fingerprint.

20. The computer-readable medium of claim 19, wherein the instructions, when executed by the processing circuitry, cause the processing circuitry to report the data fingerprint to the public blockchain system in response to verifying the data fingerprint.

21. The computer-readable medium of claim 18, wherein the instructions, when executed by the processing circuitry, cause the processing circuitry to remove the third network cell from the cloud consortium responsive to determining that (i) the data fingerprint matches the second data fingerprint, and (ii) the data fingerprint does not match the third data fingerprint.

22. The computer-readable medium of claim 13, wherein the instructions, when executed by the processing circuitry, cause the processing circuitry to:
receive a second set of transaction messages after the predetermined period of time elapses;
queue the second set of transaction messages in a buffer; and
after computing the data fingerprint, process, at the network cell in the cloud consortium using the decentralized smart contract, the second set of transaction messages.

23. The computer-readable medium of claim 13, wherein the cloud consortium comprises centralized cloud computing nodes including the network cell.

* * * * *